United States Patent
Yang et al.

(10) Patent No.: US 12,106,919 B2
(45) Date of Patent: Oct. 1, 2024

(54) CIRCUIT BREAKER IDENTIFICATION METHOD AND APPARATUS, AND DEVICE

(71) Applicant: Huawei Digital Power Technologies Co., Ltd., Shenzhen (CN)

(72) Inventors: Zezhou Yang, Dongguan (CN); Liqiong Yi, Shenzhen (CN); Shu Zhong, Dongguan (CN); Yanxing Yang, Dongguan (CN); Zhanlin Ren, Dongguan (CN); Guobiao Li, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 17/749,593

(22) Filed: May 20, 2022

(65) Prior Publication Data
US 2022/0277914 A1    Sep. 1, 2022

Related U.S. Application Data

(63) Continuation of application No. PCT/CN2020/093929, filed on Jun. 2, 2020.

(30) Foreign Application Priority Data

Nov. 22, 2019 (CN) .......................... 201911159066.4

(51) Int. Cl.
*H01H 71/04* (2006.01)
*H02J 13/00* (2006.01)
*H02H 3/08* (2006.01)

(52) U.S. Cl.
CPC ............. *H01H 71/04* (2013.01); *H02J 13/00* (2013.01); *H02H 3/08* (2013.01)

(58) Field of Classification Search
CPC ............ H01H 71/04; H01H 3/08; H02J 13/00
See application file for complete search history.

(56) References Cited

U.S. PATENT DOCUMENTS

| 5,428,752 A | 6/1995 | Goren et al. |
| 6,448,672 B1 | 9/2002 | Voegeli et al. |

(Continued)

FOREIGN PATENT DOCUMENTS

| CN | 1576865 A | 2/2005 |
| CN | 101097534 A | 1/2008 |

(Continued)

OTHER PUBLICATIONS

Yang Liping et al., Operating System BIOS Design, Sell shell recommended, Feb. 28, 2018, with an English abstract total 11 pages.

*Primary Examiner* — Nabil H Syed
(74) *Attorney, Agent, or Firm* — Conley Rose, P.C.

(57) ABSTRACT

A power distribution system includes a backplane communication busbar and a circuit breaker. The backplane communication busbar includes at least one slot, and a first interface is configured in each slot. Each first interface is connected to a first resistor R1 having a different resistance value. A second interface of each circuit breaker is connected to a second resistor R2, and when the second interface of the circuit breaker is plugged in any first interface, a preset voltage interval corresponding to a resistance value of the first resistor R1 is uniquely determined by using a series circuit including the first resistor R1 and the second resistor R2.

20 Claims, 16 Drawing Sheets

(56) References Cited

U.S. PATENT DOCUMENTS

| | | | |
|---|---|---|---|
| 6,564,278 B1 | 5/2003 | Olson | |
| 10,320,177 B2 * | 6/2019 | Emerson | H02J 13/00036 |
| 2013/0066478 A1 | 3/2013 | Smith | |
| 2016/0147276 A1 | 5/2016 | Chen | |
| 2017/0262012 A1 | 9/2017 | Beeke et al. | |
| 2018/0254615 A1 * | 9/2018 | Asanza Maldonado | H02B 1/056 |
| 2021/0049892 A1 * | 2/2021 | Martin | H02B 1/056 |

FOREIGN PATENT DOCUMENTS

| | | |
|---|---|---|
| CN | 102006182 B | 12/2013 |
| CN | 103782466 A | 5/2014 |
| CN | 108270883 A | 7/2018 |
| CN | 109270369 A | 1/2019 |
| EP | 1612689 A1 | 1/2006 |
| WO | 2017024819 A1 | 2/2017 |

\* cited by examiner

When a second interface of a first circuit breaker is plugged in any first interface in a backplane communication busbar, obtain a first voltage of the first circuit breaker, where the first circuit breaker is any one of at least one circuit breaker
— 101

Determine a voltage interval within which the first voltage falls, where the voltage interval is one of different preset voltage intervals corresponding to different resistance values of first resistors R1
— 102

Determine, based on the voltage interval and correspondences between the preset voltage intervals and slot numbers, a number of a slot in which the first circuit breaker is plugged
— 103

FIG. 3

CIRCUIT BREAKER IDENTIFICATION METHOD AND APPARATUS, AND DEVICE

CROSS-REFERENCE TO RELATED APPLICATIONS

This application is a continuation application of International Patent Application No. PCT/CN2020/093929, filed on Jun. 2, 2020, which claims priority to Chinese Patent Application No. 201911159066.4, filed on Nov. 22, 2019. The disclosures of the aforementioned applications are hereby incorporated by reference in their entireties.

TECHNICAL FIELD

This application relates to the field of intelligent power distribution technologies, and in particular, to a circuit breaker identification method and apparatus, and a device.

BACKGROUND

In an intelligent power distribution system, a plurality of intelligent circuit breakers is usually installed in a cabinet or a plug-in frame. These intelligent circuit breakers need to communicate with a system controller (such as a monitor). Currently, although a bus communication technology implements automatic allocation of communication addresses of circuit breakers, that is, specific circuit breakers in the system can be learned by using the communication addresses, physical addresses of these circuit breakers cannot be identified. The physical address of the circuit breaker may be understood as a slot, in a plug-in frame power supply system, in which the circuit breaker is installed. As a result, the system controller cannot automatically obtain occupation statuses of resources in slots in the cabinet or the plug-in frame, and therefore cannot support functions such as human-computer interaction interface display, operation and maintenance management, and expansion planning.

For example, for an application scenario of human-computer interaction interface display, an actual configuration status of a plug-in frame needs to be graphically displayed in a remote human-computer interaction interface, and further a specific slot position of each circuit breaker in the plug-in frame needs to be known. However, an existing circuit breaker does not support automatic identification of a physical address. A position of each circuit breaker needs to be manually recorded, and then setting is performed in a background of the remote human-computer interaction interface. Operations are cumbersome, and position data is not updated in time. Therefore, it is difficult to ensure that a graphical resource configuration status displayed in the remote human-computer interaction interface is consistent with that of an actual system.

For another example, for an operation and maintenance management scenario, when a circuit breaker is faulty, a maintenance person needs to find the faulty circuit breaker, and perform maintenance or replacement. When arriving at the site and then searching for the faulty circuit breaker, the maintenance person often needs to perform determining based on information, such as an indicator, appearance, or electrical signal, of each circuit breaker. As a result, labor costs are high, and therefore operation and maintenance costs are increased.

For another example, for an expansion planning scenario, when a system is expanded to increase load, if a decision maker does not know an occupation status of a space resource in an existing plug-in frame or cabinet, the decision maker cannot quickly and efficiently determine a specific slot in which a circuit breaker with a suitable volume and capacity can be installed, causing a limitation on circuit breaker configuration and expansion.

Therefore, how to automatically identify a specific position of each circuit breaker in a cabinet or a plug-in frame to meet actual different scenario requirements and improve an intelligent feature of a plug-in frame power supply system is a technical problem that is to be resolved by a person skilled in the art.

SUMMARY

This application provides a circuit breaker identification method and apparatus, and a device, to automatically identify a circuit breaker plugged in a slot in a cabinet or a plug-in frame, to meet requirements of different functions such as human-computer interaction interface display, operation and maintenance management, and expansion planning. In an example, this application discloses the following technical solutions.

According to a first aspect, this application provides a circuit breaker identification method. The method is applied to a power distribution system, and the power distribution system includes a backplane communication busbar and at least one circuit breaker. The backplane communication busbar includes at least one slot, a first interface is configured in each slot, each first interface is connected to a first resistor R1, and each first resistor R1 has a different resistance value. Each circuit breaker includes a second interface, the second interface is connected to a second resistor R2, and when the second interface of the circuit breaker is plugged in any first interface in the backplane communication busbar, a preset voltage interval corresponding to a resistance value of a first resistor R1 is uniquely determined by using a series circuit including the first resistor R1 and the second resistor R2.

The method includes, when a second interface of a first circuit breaker is plugged in any first interface in the backplane communication busbar, obtaining a first voltage of the first circuit breaker, where the first circuit breaker is any one of the at least one circuit breaker; determining a voltage interval within which the first voltage falls, where the voltage interval is one of different preset voltage intervals corresponding to different resistance values of first resistors R1; and determining, based on the voltage interval and correspondences between the preset voltage intervals and slot numbers, a number of a slot in which the first circuit breaker is plugged.

The first resistor R1 may be a component in the first interface, or may be a component outside the first interface. This is not limited in this application.

In this aspect, a special hardware circuit is configured on each interface of the backplane communication busbar and the circuit breaker. In an example, the first resistor is additionally disposed on each first interface of the backplane communication busbar, and the first resistor on each first interface has the different resistance value; and the second resistor is additionally disposed on the second interface of the circuit breaker, so that unique correspondences between slot numbers of all slots in the busbar and preset voltage intervals corresponding to resistance values of the first resistors are established. Therefore, when a circuit breaker disposed with a special interface is plugged in the busbar, a number of a slot in which the circuit breaker is plugged can be identified based on the correspondences by detecting a voltage on a second resistor of the circuit breaker, to implement automatic identification of the system for a slot in which each intelligent circuit breaker is plugged, thereby facilitating subsequent management of the power distribution system.

With reference to the first aspect, in a possible implementation of the first aspect, before determining a number of a slot in which the first circuit breaker is plugged, the method further includes obtaining the correspondences between the preset voltage intervals and the slot numbers, where the correspondences include a relationship between a preset voltage interval corresponding to each resistance value of the first resistors R1 and a slot number corresponding to the resistance value. In this implementation, the preset voltage interval corresponding to each resistance value of the first resistors is determined, to obtain the correspondences between the slot numbers and the preset voltage intervals, generate a preset voltage list, and store the preset voltage list for preparing for circuit breaker identification.

With reference to the first aspect, in another possible implementation of the first aspect, the preset voltage interval is obtained based on a sampled voltage of a second resistor R2; and the sampled voltage of the second resistor R2 is obtained through calculation based on a reference voltage, a resistance value of a first resistor R1, and a resistance value of the second resistor R2. In the implementation, a preset voltage interval corresponding to the resistance value of each first resistor may be calculated based on a series circuit including the first resistor and a second resistor, to provide a basis for subsequently generating the preset voltage list.

With reference to the first aspect, in still another possible implementation of the first aspect, the method further includes obtaining a data packet sent by the first circuit breaker, where the data packet includes a number of the first circuit breaker; and generating a circuit breaker registry based on the number of the first circuit breaker and the slot number of the first circuit breaker, where the circuit breaker registry includes a correspondence between the number of the first circuit breaker and the slot number of the first circuit breaker. In this implementation, the circuit breaker registry is generated, so that a circuit breaker access status of each slot in the backplane communication busbar can be displayed. Therefore, a load status of the busbar can be detected in real time, thereby facilitating operation and maintenance and management.

According to a second aspect, this application further provides a circuit breaker identification method. The method is applied to a power distribution system, and the power distribution system includes a backplane communication busbar and at least one circuit breaker. The backplane communication busbar includes a first chip and at least one slot, a first interface is configured in each slot, there is an independent communication channel between the first chip and at least one first interface, and each communication channel corresponds to a number of one slot in which a first interface is located.

The method includes sending, by using a first communication channel, a first signal to a first interface corresponding to the first communication channel, where the first communication channel is any one of the at least one independent communication channel established between the first chip and the at least one first interface; if receiving a second signal fed back by using the first communication channel, determining that a circuit breaker is plugged in the first interface connected to the first communication channel and a number of a slot in which the circuit breaker is plugged; parsing the second signal to obtain a number of the circuit breaker, where the second signal includes the number of the circuit breaker; and identifying, based on the number of the circuit breaker and the number of the slot in which the circuit breaker is plugged, the circuit breaker plugged in the first interface.

In this aspect, a communication channel is established between the first chip and each interface in the busbar, so that a circuit breaker access status of the busbar can be automatically identified based on signal transmission on each communication channel, thereby improving circuit breaker identification efficiency.

Optionally, if the first chip is a gating chip, the gating chip is connected to all first interfaces in the backplane communication busbar, so that there is an independent communication channel between each of all the first interfaces and the gating chip.

In addition, optionally, if the first chip is a microcontroller unit (MCU), the MCU is connected to a part of first interfaces in the backplane communication busbar, so that there is an independent communication channel between each of the part of first interfaces and the MCU. In this implementation, a plurality of MCUs are disposed in the backplane communication busbar to identify a circuit breaker status of a slot managed by each MCU, to avoid making a software/hardware change on a monitor, and also avoid disposing a gating chip in the backplane communication busbar.

With reference to the second aspect, in a possible implementation of the second aspect, the method further includes generating a circuit breaker registry based on the number of the circuit breaker and the number of the slot in which the circuit breaker is plugged, where the circuit breaker registry includes a correspondence between the number of the circuit breaker and the slot number of the circuit breaker. In this embodiment, a circuit breaker registry can be refreshed in real time, so that a circuit breaker connection status of the backplane communication busbar can be accurately displayed, thereby facilitating subsequent operation and maintenance of the power distribution system.

According to a third aspect, this application further provides a circuit breaker identification apparatus. The apparatus is applied to a power distribution system, and the power distribution system includes a backplane communication busbar and at least one circuit breaker. The backplane communication busbar includes at least one slot, a first interface is configured in each slot, each first interface is connected to a first resistor R1, and each first resistor R1 has a different resistance value. Each circuit breaker includes a second interface, the second interface is connected to a second resistor R2, and when the second interface of the circuit breaker is plugged in any first interface in the backplane communication busbar, a preset voltage interval corresponding to a resistance value of a first resistor R1 is uniquely determined by using a series circuit including the first resistor R1 and the second resistor R2.

The apparatus includes an obtaining unit and a processing unit, and may further include a sending unit, a storage unit, and the like.

In an example, the obtaining unit is configured to, when a second interface of a first circuit breaker is plugged in any first interface in the backplane communication busbar, obtain a first voltage of the first circuit breaker, where the first circuit breaker is any one of the at least one circuit breaker; and the processing unit is configured to determine a voltage interval within which the first voltage falls, where the voltage interval is one of different preset voltage intervals corresponding to different resistance values of first resistors R1; and determine, based on the voltage interval and correspondences between the preset voltage intervals and slot numbers, a number of a slot in which the first circuit breaker is plugged.

With reference to the third aspect, in a possible implementation of the third aspect, the obtaining unit is further configured to, before the number of the slot in which the first circuit breaker is plugged is determined, obtain the correspondences between the preset voltage intervals and the slot numbers, where the correspondences include a relationship between a preset voltage interval corresponding to each resistance value of the first resistors R1 and a slot number corresponding to the resistance value.

The preset voltage interval is obtained based on a sampled voltage of a second resistor R2; and the sampled voltage of the second resistor R2 is obtained through calculation based on a reference voltage, a resistance value of a first resistor R1, and a resistance value of the second resistor R2.

With reference to the third aspect, in a possible implementation of the third aspect, the obtaining unit is further configured to obtain a data packet sent by the first circuit breaker, where the data packet includes a number of the first circuit breaker; and the processing unit is further configured to generate a circuit breaker registry based on the number of the first circuit breaker and the slot number of the first circuit breaker, where the circuit breaker registry includes a correspondence between the number of the first circuit breaker and the slot number of the first circuit breaker.

According to a fourth aspect, this application further provides a circuit breaker identification apparatus. The apparatus is applied to a power distribution system, and the power distribution system includes a backplane communication busbar and at least one circuit breaker. The backplane communication busbar includes a first chip and at least one slot, a first interface is configured in each slot, there is an independent communication channel between the first chip and at least one first interface, and each communication channel corresponds to a number of one slot in which a first interface is located.

The apparatus includes a processing unit and a sending unit. Further, the sending unit is configured to send, by using a first communication channel, a first signal to a first interface corresponding to the first communication channel, where the first communication channel is any one of the at least one independent communication channel established between the first chip and the at least one first interface.

The processing unit is configured to, if a second signal fed back by using the first communication channel is received, determine that a circuit breaker is plugged in the first interface connected to the first communication channel and a number of a slot in which the circuit breaker is plugged. The processing unit is further configured to parse the second signal to obtain a number of the circuit breaker, where the second signal includes the number of the circuit breaker; and identify, based on the number of the circuit breaker and the number of the slot in which the circuit breaker is plugged, the circuit breaker plugged in the first interface.

Optionally, if the first chip is a gating chip, the gating chip is connected to all first interfaces in the backplane communication busbar, so that there is an independent communication channel between each of all the first interfaces and the gating chip.

Optionally, if the first chip is an MCU, the MCU is connected to a part of first interfaces in the backplane communication busbar, so that there is an independent communication channel between each of the part of first interfaces and the MCU.

With reference to the fourth aspect, in a possible implementation of the fourth aspect, the processing unit is further configured to generate a circuit breaker registry based on the number of the circuit breaker and the number of the slot in which the circuit breaker is plugged, where the circuit breaker registry includes a correspondence between the number of the circuit breaker and the slot number of the circuit breaker.

According to a fifth aspect, this application further provides a backplane communication busbar, including at least one slot. A first interface is disposed in each slot, each first interface is connected to a first resistor R1, and each first resistor R1 has a different resistance value. Each first interface is configured to be connected to a second interface of a circuit breaker. The second interface of the circuit breaker is connected to a second resistor R2, and when the second interface of the circuit breaker is plugged in any first interface in the backplane communication busbar, a preset voltage interval corresponding to a resistance value of a first resistor R1 is uniquely determined by using a series circuit including the first resistor R1 and the second resistor R2, to determine, based on the preset voltage interval, a slot number of the circuit breaker plugged in any slot.

According to a sixth aspect, this application further provides a circuit breaker. The circuit breaker includes a second interface and a second resistor R2. The second resistor R2 is connected to the second interface. The second interface is configured to be connected to a first interface in any slot in a backplane communication busbar. The backplane communication busbar includes at least one slot, a first interface is disposed in each slot, each first interface is connected to a first resistor R1, and each first resistor R1 has a different resistance value.

When the second interface of the circuit breaker is plugged in any first interface in the backplane communication busbar, a preset voltage interval corresponding to a resistance value of a first resistor R1 is uniquely determined by using a series circuit including the first resistor R1 and the second resistor R2, to determine, based on the preset voltage interval, a slot number of the circuit breaker plugged in any slot.

According to a seventh aspect, this application further provides a communication device, including a processor, where the processor is coupled to a memory; and the memory, configured to store instructions. The processor is configured to execute the instructions in the memory, to enable the communication device to perform the method according to the first aspect and the implementations of the first aspect, or the second aspect and the implementations of the second aspect.

Optionally, the communication apparatus may be disposed in a backplane communication busbar, or may be disposed in an external device, such as a monitor.

According to an eighth aspect, this application further provides a computer-readable storage medium. The computer-readable storage medium stores instructions. When the instructions are run on a computer or a processor, the method according to the first aspect or the implementations of the first aspect is performed.

In addition, when the instructions are run on a computer or a processor, the method according to the second aspect or the implementations of the second aspect is performed.

According to a ninth aspect, an embodiment of this application further provides a computer program product. The computer program product includes computer instructions. When the computer instructions are executed by a computer or a processor, the method according to any one of the first aspect or the implementations of the first aspect or the method according to any one of the second aspect or the implementations of the second aspect can be implemented.

BRIEF DESCRIPTION OF DRAWINGS

FIG. 3 is a flowchart of a circuit breaker identification method according to an embodiment of this application;

DESCRIPTION OF EMBODIMENTS

To make a person skilled in the art understand the technical solutions in embodiments of this application better, and make the objectives, features, and advantages of embodiments of this application clearer, the following further describes the technical solutions in embodiments of this application with reference to the accompanying drawings.

First, an applied technical scenario and related concepts in embodiments of this application are described.

The technical solutions in embodiments of this application may be applied to a power distribution system or an intelligent power distribution system. In an example, the power distribution system is a system that performs functions such as connection, breaking, protection, transfer, and metering on alternating current or direct current power. In an example, the power distribution system may include components such as a circuit breaker, a busbar, a conductor, a switch, a sensor, and a control system (such as a monitor). The circuit breaker may be a switch having a breaking capability for a faulty current. If the current exceeds a preset threshold, a breaking action is triggered. Alternatively, the breaking action may be triggered by a breaking instruction.

In addition to all components of the power distribution system, the intelligent power distribution system further includes a plurality of intelligent circuit breakers plug-connected to a cabinet or a plug-in frame. The intelligent circuit breaker is a circuit breaker with a controller and an active actuator (such as a motor). The intelligent circuit breaker can accept and execute an external instruction. The instruction may be a switch on/off operation instruction, or may be an instruction for configuring a parameter in a processing unit or a control unit in the intelligent circuit breaker.

In an existing intelligent power distribution system, a plurality of intelligent circuit breakers is installed. These intelligent circuit breakers need to communicate with a system controller (such as a monitor), so that communication address allocation can be implemented. However, the system cannot identify physical addresses of the circuit breakers, that is, slots, in a plug-in frame, in which the circuit breakers are installed or corresponding slot numbers. As a result, the system-level controller cannot automatically obtain occupation status of resources in slots in the plug-in frame, bringing inconvenience for power distribution management.

Figure 1A:
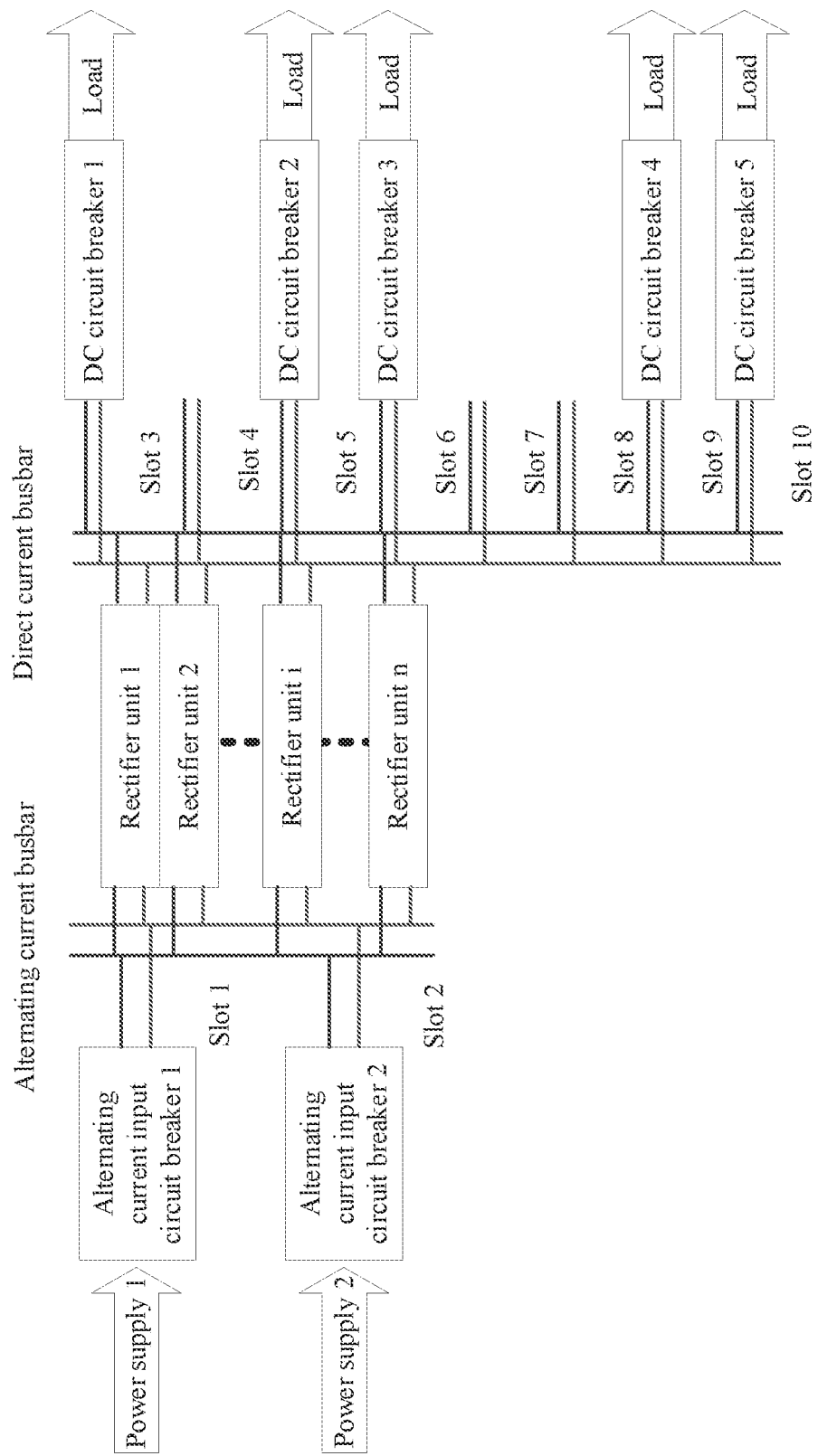
FIG. 1A is a schematic diagram of a structure of a power-level intelligent power distribution system according to an embodiment of this application.
Figure 1B:
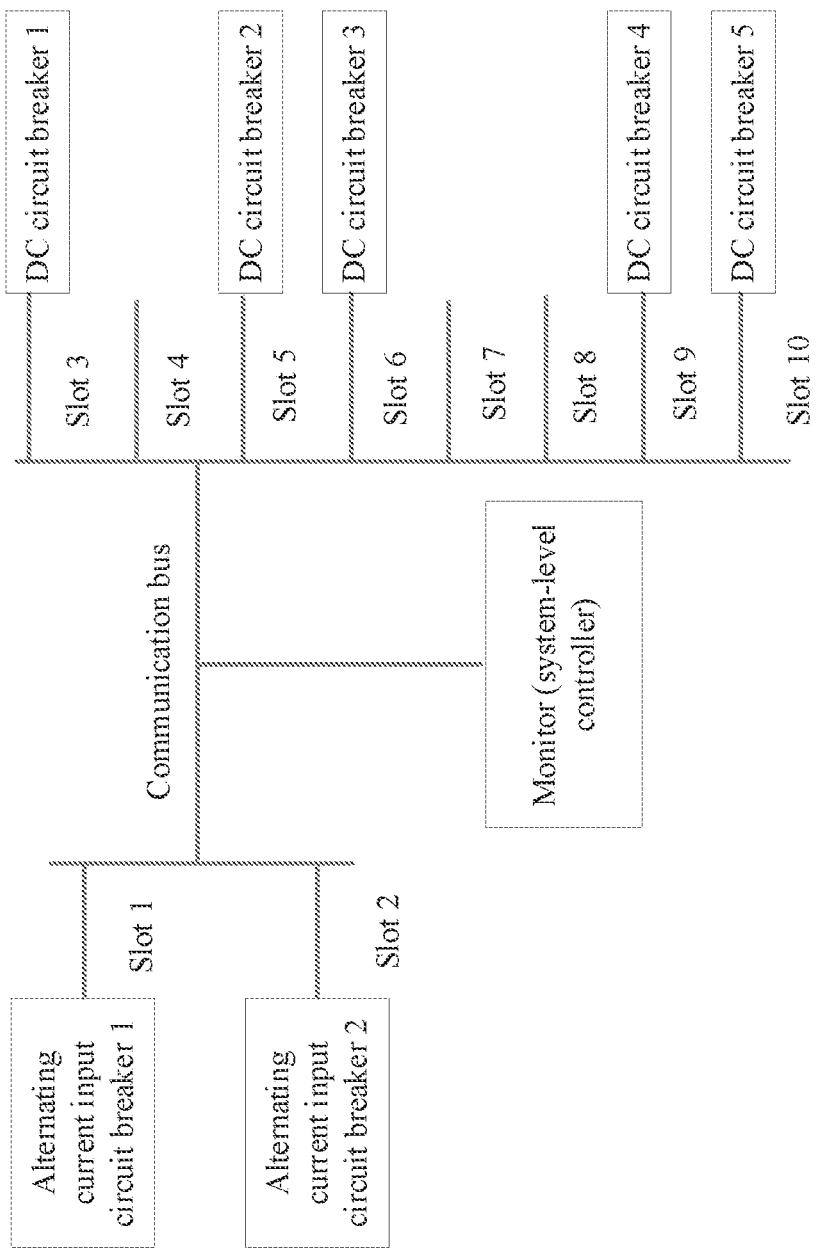
FIG. 1B is a schematic diagram of a structure of a communication-related intelligent power distribution system according to an embodiment of this application.

FIG. 1A and FIG. 1B each are a schematic diagram of a structure of an intelligent power distribution system according to an embodiment of this application. FIG. 1A shows a power-level structure relationship, and FIG. 1B shows a communication transmission correspondence. A plug-in frame includes 10 circuit breaker interfaces and 10 corresponding slots, and slot numbers are sequentially slots 1 to 10. At most two of these 10 interfaces can be plug-connected to input circuit breakers, and the remaining eight interfaces can be plug-connected to output circuit breakers.

For example, a slot 1 and a slot 2 are located in an alternating current busbar, and are configured to access alternating current (AC) input circuit breakers 1 and 2. A slot 3 to a slot 10 are located in a direct current busbar, and are configured to access direct current (DC) circuit breakers. For example, in FIG. 1A, a DC circuit breaker 1 to a DC circuit breaker 5 are respectively plugged in a slot 3, a slot 5, a slot 6, a slot 9, and a slot 10. The direct current busbar is connected to the alternating current busbar by using a rectifier unit 1, a rectifier unit 2, . . . , and a rectifier unit n.

As shown in FIG. 1B, an intelligent power distribution system further includes a system-level controller, such as a monitor. The monitor is connected to circuit breakers by using a communication bus, and is configured to identify whether each slot is connected to a circuit breaker, generate a circuit breaker registry based on connection statuses of the circuit breakers, and display the circuit breaker registry in a monitoring background.

It should be noted that, in this embodiment, the power distribution system with 10 interfaces is used as an example. However, the content of the present disclosure is not limited to the form in the example, and more interfaces or other devices may be further included. This is not limited in this application.

To resolve the foregoing technical problem, in the technical solutions of this application, a specific hardware circuit is added to a backplane of a power distribution system, an external control board (signal conditioning board) of a circuit breaker, or a monitor, so that each circuit breaker slot (or slot) has a unique identifier, so that the monitor in the system learns a slot in which each circuit breaker is located. The specific hardware circuit includes technical solutions in the following Embodiment 1, Embodiment 2, and Embodiment 3, and the like. The following describes the technical solutions in embodiments in detail.

Embodiment 1

Figure 2A:
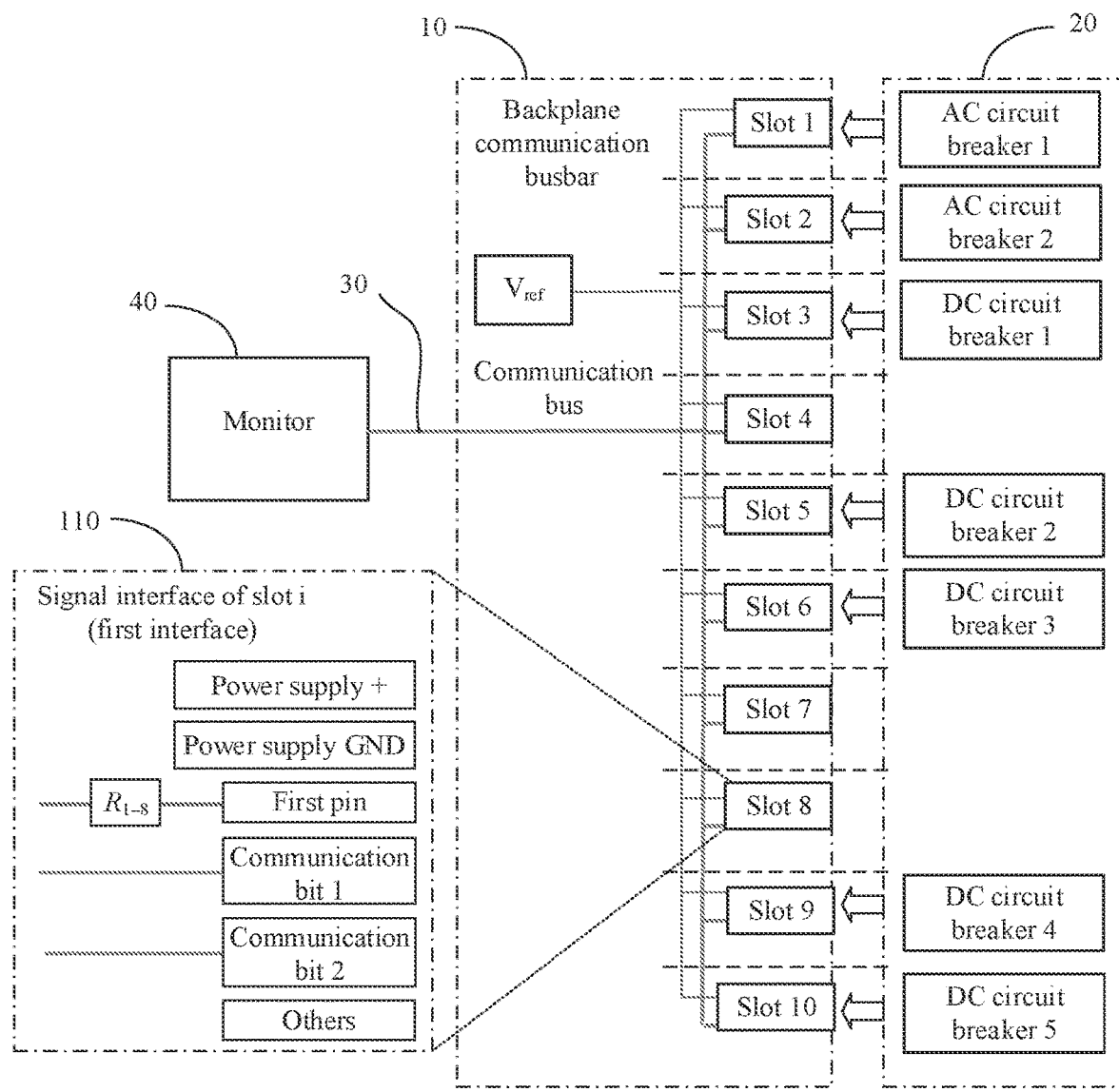
FIG. 2A is a schematic diagram of a structure of an intelligent power distribution system according to an embodiment of this application.

In this embodiment, when a circuit breaker has a built-in control chip, a hardware structure of a voltage divider resistor in a power distribution system is improved, including three aspects, namely, an interface configuration, a resistor configuration, and a voltage identification method. In an example, FIG. 2A is a schematic diagram of a structure of an intelligent power distribution system, including a backplane communication busbar 10, a circuit breaker cluster 20, a communication bus 30, and a monitor 40. The backplane communication busbar 10 is connected to the circuit breaker cluster 20 by using interfaces, and the backplane communication busbar 10 is connected to the monitor 40 by using the communication bus 30.

Referring to FIG. 2A, the backplane communication busbar 10 includes at least one slot, for example, a slot 1 to a slot 10. A first interface 110 is configured in each slot, and the first interface 110 is configured to be physically connected to a circuit breaker. Further, each first interface 110 includes a first pin and a first resistor R1, and R1 on each first interface 110 has a different resistance value. For R1 distinguishing, in this embodiment, first resistors R1 on different interfaces are each marked as "$R_{1-i}$", where "i" represents a slot number, and i∈{1, 2, 3, . . . , 10}. For example, a first resistor corresponding to a slot number 8 is $R_{1-8}$.

In a first interface 110 of the slot number 8, a first pin is connected to the first resistor $R_{1-8}$. When the first pin is connected to a circuit breaker, the first resistor $R_{1-8}$ shares a partial voltage, to generate a divided voltage between a power supply and the first pin. Therefore, the first pin may be referred to as a "voltage division bit".

Optionally, the first resistor $R_{1-i}$ may be a component in the first interface, or may be a component outside the first interface. This is not limited in this embodiment.

In addition, the first interface 110 further includes a power supply positive electrode "+", "power supply+" for short, a power supply ground (GND), "power supply GND" for short, a communication bit 1, a communication bit 2, and other structural units. This is not limited in this embodiment. The communication bit 1 and the communication bit 2 are configured to transmit signals on the communication bus. For example, the communication bit 1 is configured to send a signal, and the communication bit 2 is configured to receive a signal.

Figure 2B:
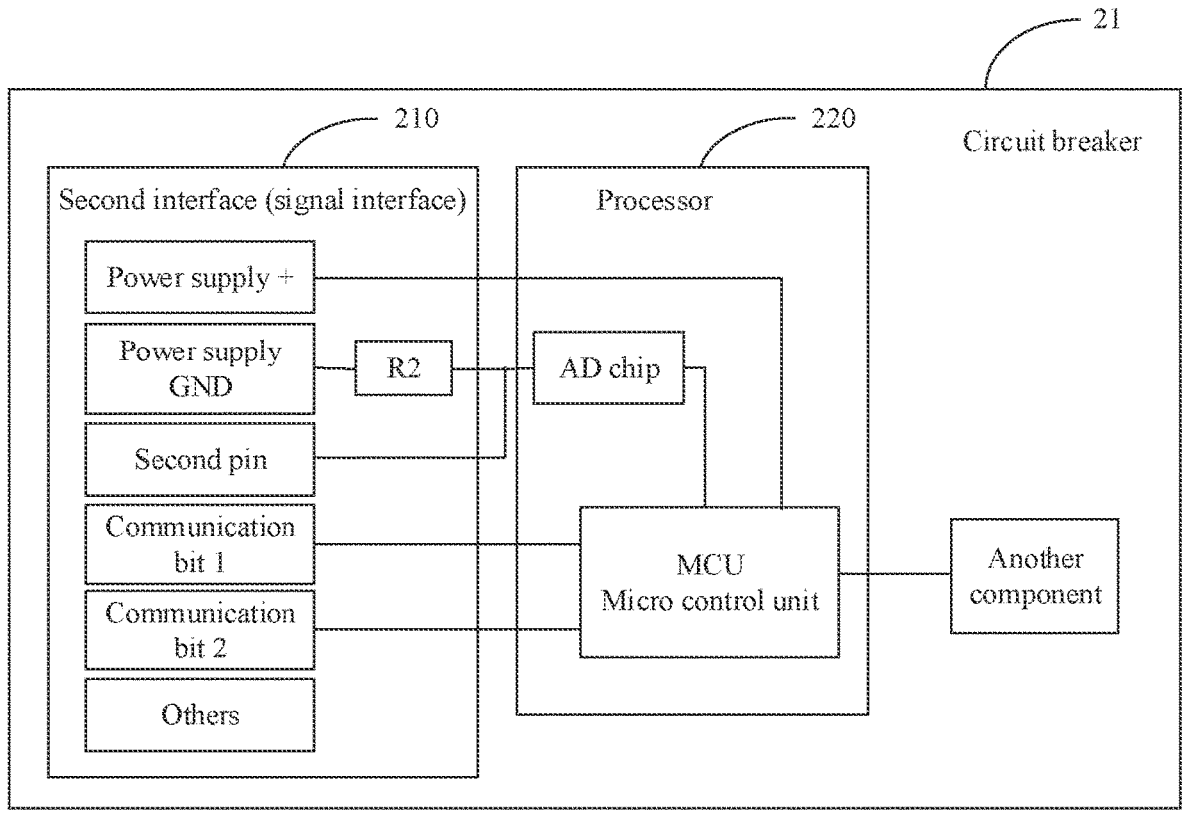
FIG. 2B is a schematic diagram of a structure of a circuit breaker according to an embodiment of this application.

Correspondingly, to match the first interface 110 shown in FIG. 2A, this embodiment further provides a circuit breaker. As shown in FIG. 2B, a circuit breaker 21 includes a second interface 210 and a processor 220. The second interface 210 is a signal interface of the circuit breaker. The second interface 210 is coupled to the processor 220, and the second interface 210 is configured to be physically connected to the first interface 110 in the backplane communication busbar.

Further, the second interface 210 includes power supply+, a power supply GND, a second pin, a second resistor R2, a communication bit 1, a communication bit 2, and other structure units, and these structures match the first interface 110. In addition, the second resistor R2 is disposed between the power supply GND and the second pin. In this embodiment, the second resistor R2 may be disposed in the second interface 210, or may be disposed outside the second interface 210. This is not limited in this embodiment.

Referring to FIG. 2B, the processor 220 includes an AD chip and a MCU. The AD chip is connected to the power supply GND by using the second resistor R2, and is configured to detect a voltage on the second resistor R2. The voltage on the second resistor R2 may be referred to as a sampled voltage, and is represented by "$V_i$". In addition, the AD chip further has an analog-to-digital conversion (AD) function.

It should be understood that when the second pin is connected to any first pin in the backplane communication busbar 10, a divided voltage is generated on the second resistor R2. Therefore, similar to the foregoing first pin, the second pin in the circuit breaker may also be referred to as a "voltage division bit".

Figure 2C:
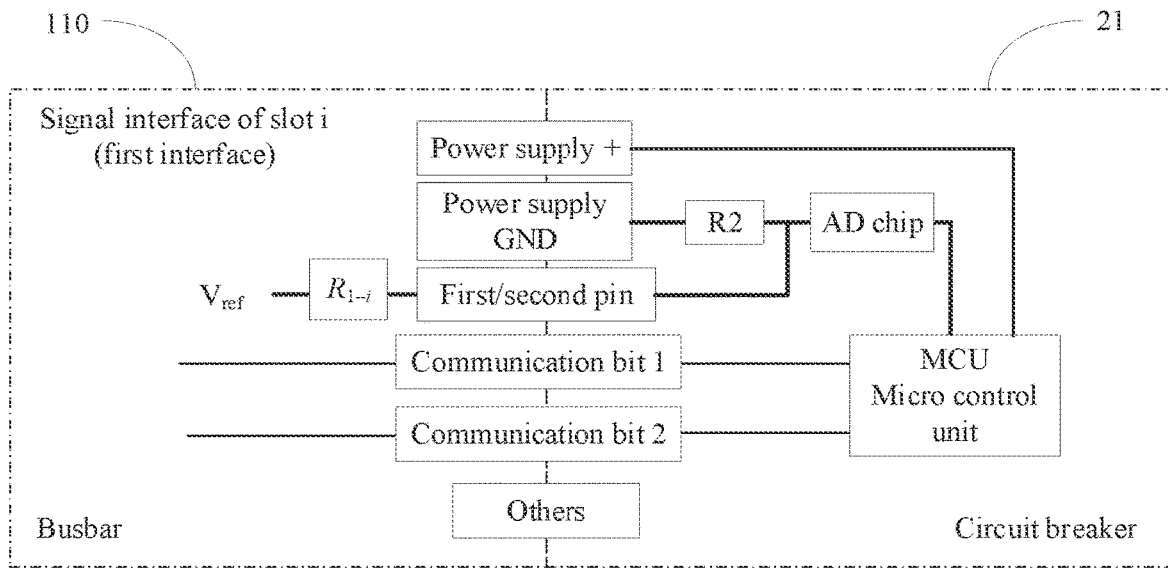
FIG. 2C is a diagram of a series circuit obtained after a circuit breaker is plugged in a busbar according to an embodiment of this application.

When the second interface 210 of the circuit breaker 21 is connected to any first interface 110 in the backplane communication busbar 10, the second resistor R2 on the second interface 210 forms, by using the second pin, a series circuit with a first resistor $R_{1-i}$ connected to a first pin of the backplane communication busbar 10. As shown in FIG. 2C, the first pin is connected to the second pin, and the remaining structural units are sequentially connected, to form a series circuit including the first resistor and the second resistor. A first power module supplies power to the first resistor, a voltage output by the first power module is a reference voltage, the reference voltage is represented as "$V_{ref}$", an R2 voltage detected at the AD chip is the sampled voltage $V_i$.

Further, the sampled voltage $V_i$ and the reference voltage $V_{ref}$ in the series circuit meets a first relationship formula, and the first relationship formula is as follows.

$$V_i = \frac{R2}{R2+R1} \times V_{ref}.$$

Because a first resistor in each slot in the busbar has a different resistance value, a unique sampled voltage $V_i$ may be determined based on a resistance value of each first resistor. Finally, a preset voltage interval corresponding to each of slot numbers 1 to 10 is determined based on each sampled voltage $V_i$. The preset voltage interval is represented as and the following preset voltage interval $V_{i-ref}$ is obtained according to the first relationship formula.

$$V_{i-ref} = V_i \pm \Delta = \frac{R2}{R2+R1} \times V_{ref} \pm \Delta,$$

where $\Delta$ is a signal tolerance. For example, in this embodiment, when $\Delta=0.5V$, $V=12$ V, and $R2=5$ kΩ are set, when a first resistor $R_{1-i}=45$ kΩ, the following sampled voltage $V_1$ of $R_{1-i}$ is obtained according to the first relationship formula.

$$V_1 = \frac{R2}{R2+R1} \times V_{ref} = \frac{5k}{5k+45k} \times 12 \text{ V} = 1.2 \text{ V}.$$

In addition, when Δ is 0.5 V, a preset voltage interval of $R_{1-i}$ is $V_{1-ref}=V_1\pm\Delta=1.2\pm0.5$.

A preset voltage list is generated according to the first relationship formula by using an example in which first resistors $R_{1-i}$ in the 10 slots uniformly distribute voltages, and is shown in the following Table 1.

TABLE 1

Preset voltage list

| Slot number | First resistor $R_{1-i}$ (kΩ) | Preset voltage interval $V_{i-ref}$ (V) |
|---|---|---|
| 1 | 45 | 1.2 ± 0.5 |
| 2 | 20 | 2.4 ± 0.5 |
| 3 | 12 | 3.6 ± 0.5 |
| 4 | 7.5 | 4.8 ± 0.5 |
| 5 | 5 | 6.0 ± 0.5 |
| 6 | 3.3 | 7.2 ± 0.5 |
| 7 | 2.1 | 8.4 ± 0.5 |
| 8 | 1.25 | 9.6 ± 0.5 |
| 9 | 0.56 | 10.8 ± 0.5 |
| 10 | 0 | 12.0 ± 0.5 |

In this embodiment, the first resistor $R_{1-i}$ is additionally disposed in each first interface of the backplane communication busbar, and a second resistor R2 is additionally disposed in a second interface of each circuit breaker, so that a series circuit including a first resistor $R_{1-i}$ and the second resistor R2 is formed when the second interface of the circuit breaker is plugged in a first interface of the busbar. A preset voltage interval $V_{i-ref}$ corresponding to $R_{1-i}$, of each resistance value can be calculated based on the series circuit, to obtain correspondences between the slot numbers and preset voltage intervals $V_{i-ref}$, generate the preset voltage list, and store the preset voltage list for preparing for circuit breaker identification.

In this embodiment, a circuit breaker identification method is proposed by using the structures of the foregoing backplane communication busbar and circuit breaker. In this method, a number of a slot, in a backplane communication busbar, in which a circuit breaker is plugged can be automatically identified, and further related information such as a number of the circuit breaker can be determined. The method may be applied to the foregoing power distribution system shown in FIG. 2A, FIG. 2B, and FIG. 2C. As shown in FIG. 3, the method includes the following steps.

101. When a second interface of a first circuit breaker is plugged in any first interface in the backplane communication busbar, obtain a first voltage of the first circuit breaker, where the first circuit breaker is any one of at least one circuit breaker.

The first circuit breaker is any circuit breaker in a circuit breaker cluster, and each circuit breaker in the circuit breaker cluster is the circuit breaker shown in FIG. 2B. The first voltage is a divided voltage of a second resistor R2 in the circuit breaker. In an example, the first voltage may be detected and obtained by using an AD chip in the circuit breaker.

102. Determine a voltage interval within which the first voltage falls, where the voltage interval is one of different preset voltage intervals corresponding to different resistance values of first resistors R1.

103. Determine, based on the voltage interval and correspondences between the preset voltage intervals and slot numbers, a number of a slot in which the first circuit breaker is plugged.

Before step 103, the method further includes obtaining the correspondences between the preset voltage intervals and the slot numbers, where the correspondences include a relationship between a preset voltage interval corresponding to each resistance value of the first resistors R1 and a slot number corresponding to the resistance value. In an example, for an obtaining process, refer to the description of obtaining the preset voltage list (See for example Table 1) in the foregoing embodiment. Details are not described herein again.

In an example, when it is detected that the first voltage is 3.8 V, it is determined that the first voltage falls within a preset voltage interval of 3.6±0.5 V, and the preset voltage interval of 3.6±0.5 V corresponds to a slot number 3 based on a preset voltage list (refer to the foregoing Table 1) configured in advance. Therefore, it is determined that the number of the first slot in which the first circuit breaker is plugged is a slot 3.

Likewise, a slot number corresponding to each circuit breaker plugged in the backplane communication busbar is obtained according to the foregoing steps 101 to 103.

In the method provided in this embodiment, a special hardware circuit is configured on each interface of the backplane communication busbar and the circuit breaker. In an example, a first resistor is additionally disposed on each first interface of the backplane communication busbar, and the first resistor on each first interface has a different resistance value; and the second resistor is additionally disposed on the second interface of the circuit breaker, so that unique correspondences between slot numbers of all slots in the busbar and preset voltage intervals corresponding to resistance values of the first resistors are established. In an example, when a circuit breaker disposed with a special interface is plugged in the busbar, a number of a slot in which the circuit breaker is plugged can be identified based on the correspondences by detecting a voltage on a second resistor of the circuit breaker, to implement automatic identification of the system for a slot in which each intelligent circuit breaker is plugged, thereby facilitating subsequent management of the power distribution system.

In addition, after step 103, the method further includes obtaining a data packet sent by the first circuit breaker, where the data packet includes a number of the first circuit breaker; and generating a circuit breaker registry based on the number of the first circuit breaker and the slot number of the first circuit breaker.

In an example implementation, the data packet of the first circuit breaker may be transmitted by using a communication bus. The data packet may further include other information about the first circuit breaker, such as a protection threshold of the first circuit breaker and a status of the first circuit breaker.

The circuit breaker registry includes a correspondence between the number of the first circuit breaker and the slot number of the first circuit breaker. In this embodiment, the number of the first circuit breaker is a DC circuit breaker 1. In addition, the number of the circuit breaker may be alternatively an AC input circuit breaker 1, an AC input circuit breaker 2, a DC circuit breaker 2, a DC circuit breaker 3, . . . , a DC circuit breaker 10, or the like.

The following Table 2 is a circuit breaker registry, including the slot number 3 of the slot in which the first circuit breaker is plugged and the number, in an example, the DC circuit breaker 1, of the first circuit breaker. In addition, the circuit breaker registry may further include other information, such as a circuit breaker protection threshold and a circuit breaker status (not shown in Table 2). The information is not limited in this embodiment.

TABLE 2

Circuit breaker registry

| Slot number | Circuit breaker number | Slot number | Circuit breaker number |
|---|---|---|---|
| 1 | Alternating current input circuit breaker 1 | 6 | DC circuit breaker 3 |
| 2 | Alternating current input circuit breaker 2 | 7 | NAN |
| 3 | DC circuit breaker 1 | 8 | NAN |
| 4 | NAN | 9 | DC circuit breaker 4 |
| 5 | DC circuit breaker 2 | 10 | DC circuit breaker 5 |

In Table 2, no circuit breaker is plugged in the slot number 4, the slot number 7, and the slot number 8, and therefore the slot number 4, the slot number 7, and the slot number 8 are denoted as "nane" (NAN), and represented by "NAN".

In this embodiment, the circuit breaker registry is generated, so that a circuit breaker access status of each slot in the backplane communication busbar can be displayed. Therefore, a load status of the busbar can be detected in real time, thereby facilitating operation and maintenance and management.

The method provided in this embodiment may be performed by a processing chip or a processor, and further the processing chip or the processor may be configured in the backplane communication busbar; or may be implemented by a processor in the backplane communication busbar. Alternatively, the processing chip or the processor may be an external device, or may be configured in another external device in the system, for example, configured in a monitor, where connection and transmission between the monitor and the backplane communication busbar are implemented by using the communication bus.

Optionally, the processing chip or the processor is a component having a processing function. For example, the processing chip or the processor includes an integrated circuit (IC), and may include a single packaged IC, or may include a plurality of connected packaged ICs having a same function or different functions. For example, the processor may be a central processing unit (CPU).

In addition, the preset voltage list may be stored in a memory, and the memory may be disposed in the backplane communication busbar or the monitor.

Embodiment 2

This embodiment provides another circuit breaker identification method. The method is applied to a power distribution system.

Figure 4:
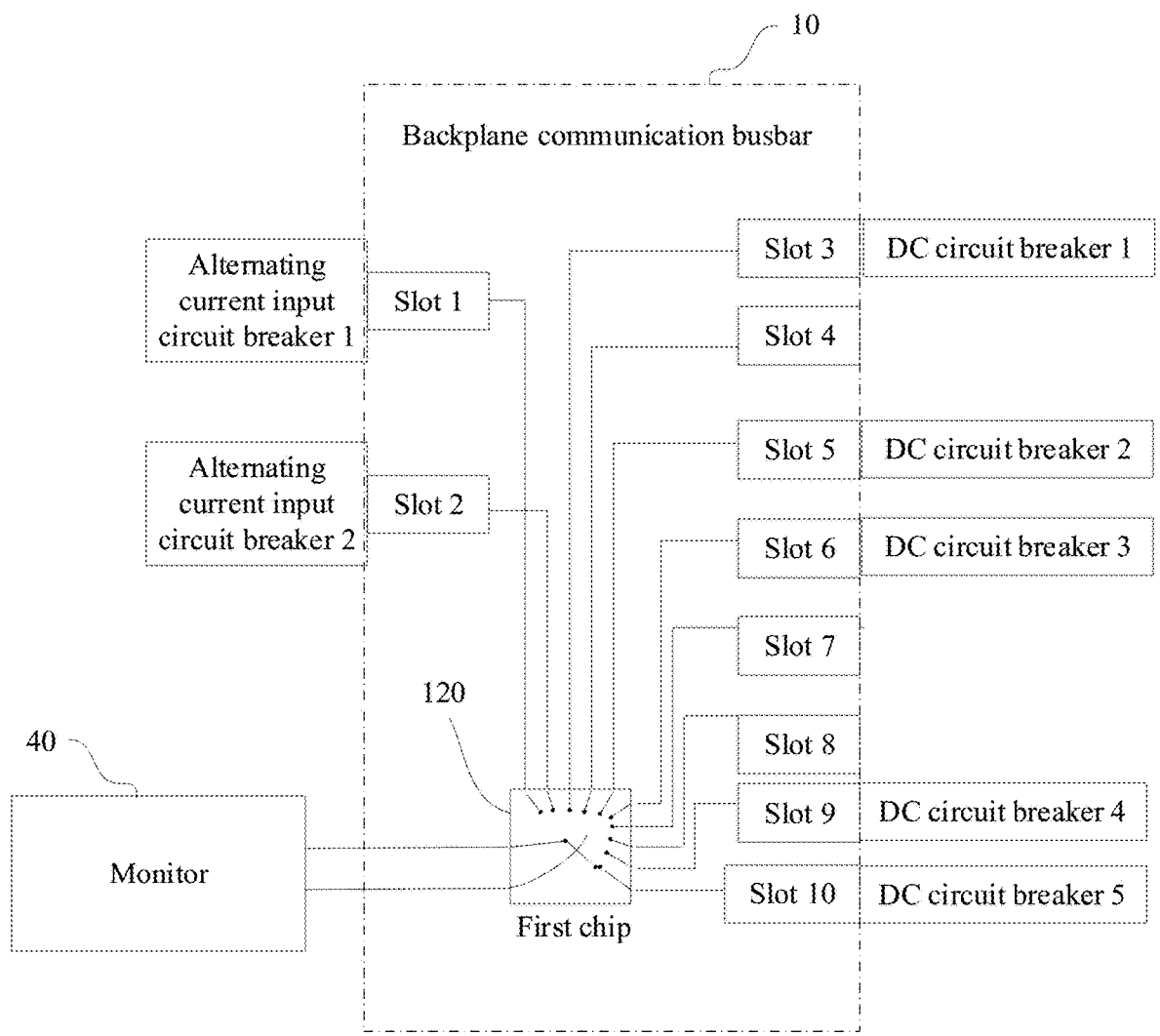
FIG. 4 is a schematic diagram of a structure of another intelligent power distribution system according to an embodiment of this application.

As shown in FIG. 4, the power distribution system includes a backplane communication busbar 10 and at least one circuit breaker. The backplane communication busbar 10 includes a first chip 120 and at least one slot, such as a slot 1 to a slot 10. A first interface is configured in each slot. There is an independent communication channel between the first chip and the at least one first interface, that is, a communication channel is established between the first chip 120 and each of the 10 slots in the backplane communication busbar 10. Each communication channel is configured to transmit a signal, and each communication channel corresponds to a number of one slot in which a first interface is located. When any circuit breaker is plugged in a first port, a unique path of the circuit breaker, a slot number, and the first chip is established, to prepare for circuit breaker identification.

In addition, the power distribution system may further include other devices such as a monitor.

Figure 5:
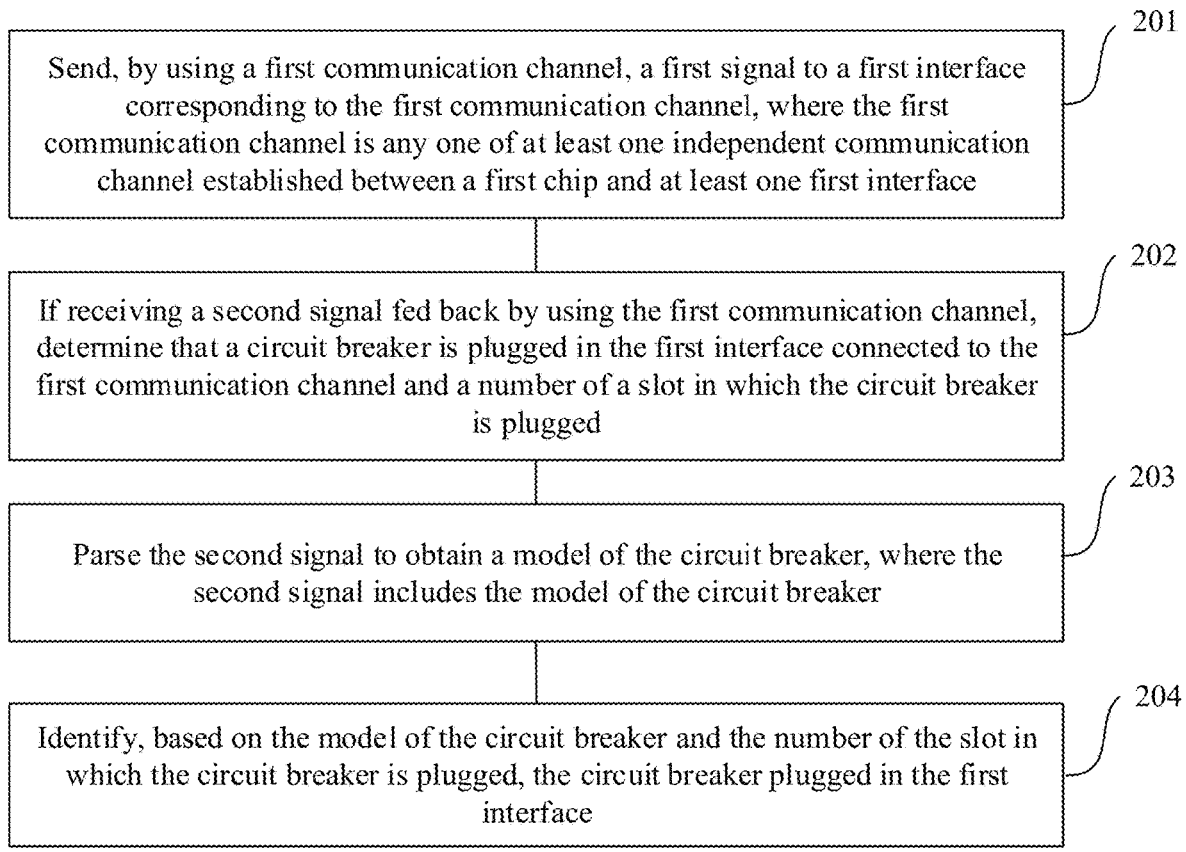
FIG. 5 is a flowchart of another circuit breaker identification method according to an embodiment of this application.

As shown in FIG. 5, the method in this embodiment may be performed by the first chip. Further, the method includes the following steps.

201: Send, by using a first communication channel, a first signal to a first interface corresponding to the first communication channel, where the first communication channel is any one of the at least one independent communication channel established between the first chip and the at least one first interface.

202: If receiving a second signal fed back by using the first communication channel, determine that a circuit breaker is plugged in the first interface connected to the first communication channel and a number of a slot in which the circuit breaker is plugged.

If no feedback signal is not received, it is determined that no circuit breaker is plugged in the first interface.

203: Parse the second signal to obtain a number of the circuit breaker, where the second signal includes the number of the circuit breaker.

In addition, the second signal further includes other information about the circuit breaker, for example, includes but is not limited to a sampled value and a working status of the circuit breaker.

204: Identify, based on the number of the circuit breaker and the number of the slot in which the circuit breaker is plugged, the circuit breaker plugged in the first interface.

For example, the first chip 120 sends a first signal to an interface of a slot 1 by using the first communication channel; and if receiving a second signal fed back by the slot 1, determines that a circuit breaker is plugged in the interface of the slot 1, and then parses the second signal to obtain related information such as a number of the circuit breaker. In this example, if the number of the circuit breaker is an alternating current input circuit breaker 1, it is identified that the alternating current input circuit breaker 1 is plugged in the slot 1.

Likewise, according to the method in the foregoing steps 201 to 204, the first chip 120 polls first interfaces in all the slots in the backplane communication busbar 10, and determines, by using a second signal, whether a circuit breaker is plugged in each slot and a number of a circuit breaker in a slot in which the circuit breaker is plugged. In the embodiment shown in FIG. 4, after polling once, the first chip identifies that circuit breakers are plugged in seven slots in the busbar, and slot numbers corresponding to these slots are a slot 1, a slot 2, a slot 3, a slot 5, a slot 6, a slot 9, and a slot 10. Then, the first chip parses a signal fed back by each circuit breaker, to obtain a number of a circuit breaker in each slot. For example, an alternating current circuit breaker 1 and an alternating current circuit breaker 2 are plugged in the slot 1 and the slot 2, DC circuit breakers are plugged in the slot 3, the slot 5, the slot 6, the slot 9, and the slot 10, and numbers of these DC circuit breakers are 1, 2, 3, 4, and 5.

In addition, after step 204, the method further includes generating a circuit breaker registry based on an identified number of each circuit breaker and an identified number of a slot in which the circuit breaker is plugged. The circuit breaker registry includes a correspondence between the number of the circuit breaker and the slot number of the circuit breaker. For example, the foregoing Table 2 is a circuit breaker registry. The circuit breaker registry can display a circuit breaker access status of each slot in the backplane communication busbar. Therefore, a load status of the busbar can be detected in real time, thereby facilitating operation and maintenance and management.

In addition, in the foregoing step 202, the second signal fed back by using the first communication channel may alternatively be obtained by actively reporting, by the circuit breaker, the second signal, that is, the circuit breaker actively sends the second signal to the first chip as soon as the circuit breaker is plugged in the first interface in the busbar. The second signal is transmitted to the first chip by using the first communication channel.

In the method provided in this embodiment, a communication channel is established between the first chip and each interface in the backplane communication busbar, so that a circuit breaker access status of the busbar can be automatically identified based on signal transmission on each communication channel, thereby improving circuit breaker identification efficiency.

Optionally, the first chip in this embodiment may be implemented in the following various manners.

In an example implementation, if the first chip is a gating chip, the gating chip is connected to each first interface in the backplane communication busbar, so that there is an independent communication channel between each first interface in the busbar and the gating chip.

Figure 6A:
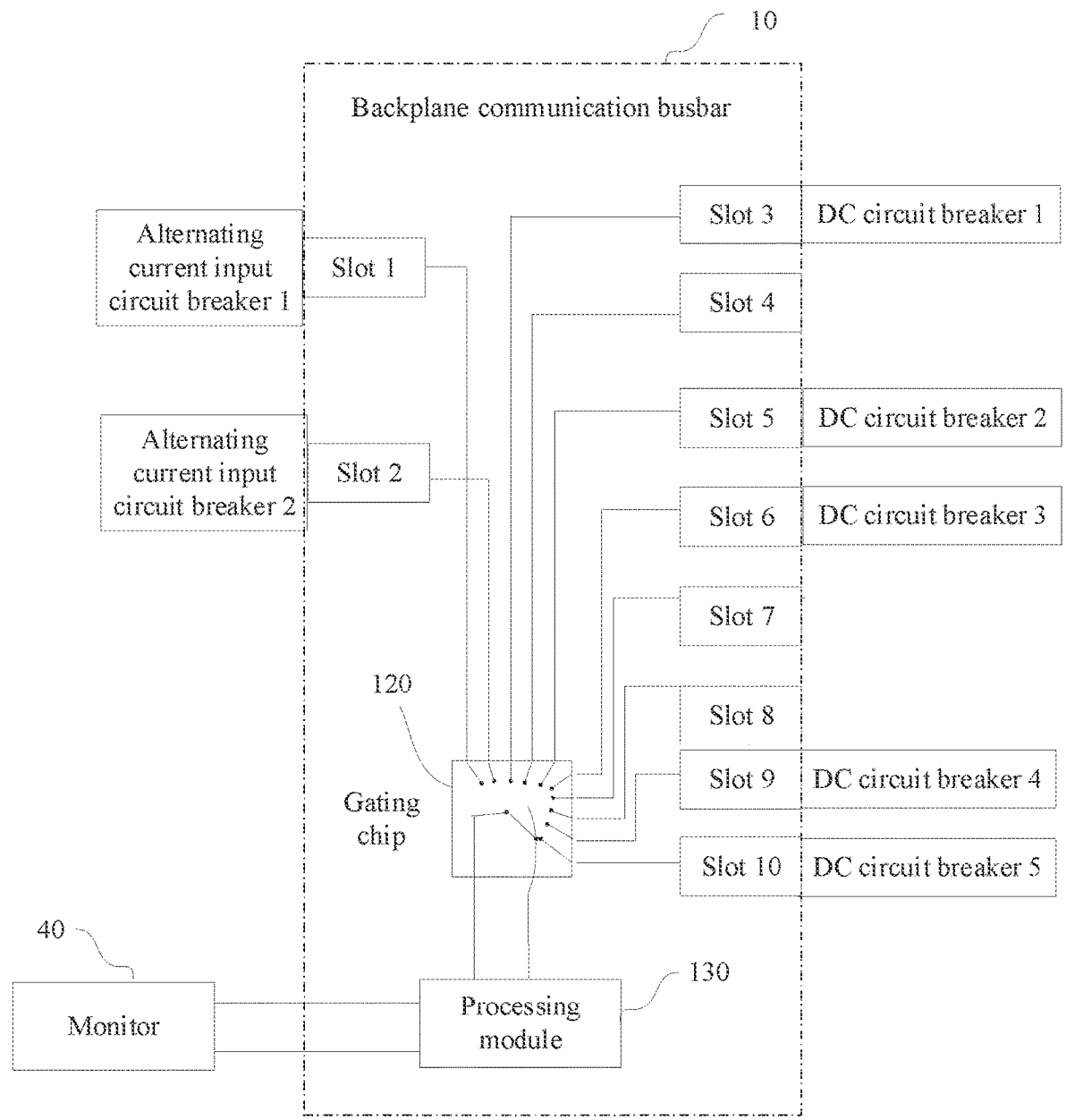
FIG. 6A is a schematic diagram of a structure of still another intelligent power distribution system according to an embodiment of this application.

As shown in FIG. 6A, a backplane communication busbar 10 includes a gating chip 120 and a processing module 130. The gating chip 120 includes a plurality of input/output (IO) interfaces, and each 10 interface is connected to an interface in one slot. The processing module 130 is connected to an interface in each slot by using the gating chip 120. Further, each 10 interface of the gating chip 120 is connected to the interface in each slot by using a pin. In this implementation, the plurality of IO interfaces is obtained through extension of the gating chip 120, so that one independent channel is allocated to each slot to transmit a signal.

Further, the gating chip 120 is connected to the processing module 130 by using a communication bus. The gating chip 120 is configured to transmit a signal, for example, send a first signal on each communication channel, receive a second signal fed back by a circuit breaker, and send the second signal to the processing module 130. The processing module 130 is configured to send/receive a signal, and identify a circuit breaker access status of each slot in the busbar based on a second signal sent by the gating chip 120.

Figure 6B:
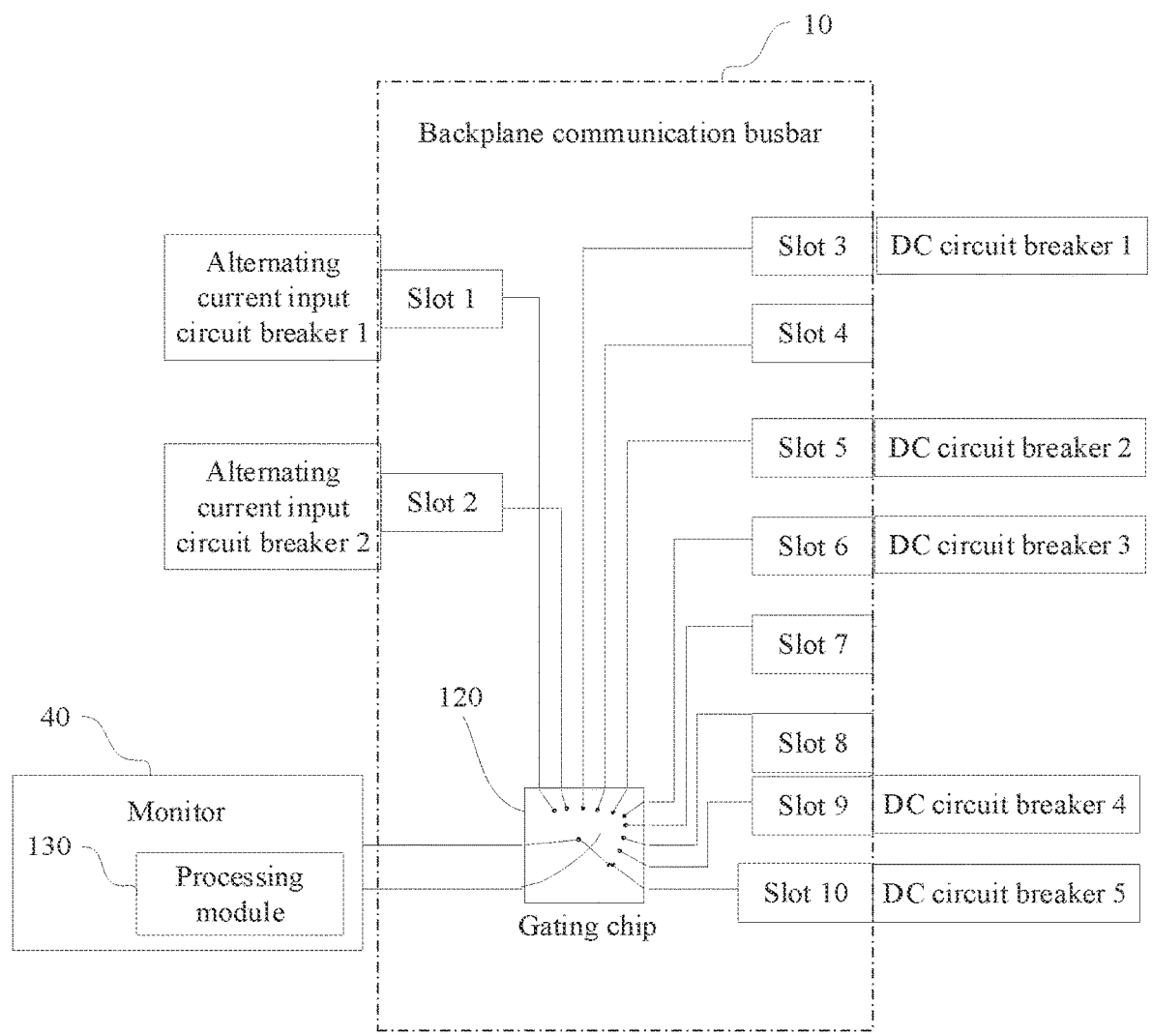
FIG. 6B is a schematic diagram of a structure of yet another intelligent power distribution system according to an embodiment of this application.

Optionally, in a possible implementation, the processing module 130 may be disposed in a monitor 40 as shown in FIG. 6B, and the processing module 130 is configured to perform the method in the foregoing steps 201 to 204.

In addition, optionally, the processing module 130 may be disposed in another component. A position and a carrier of the processing module 130 are not limited in this embodiment.

Figure 6C:
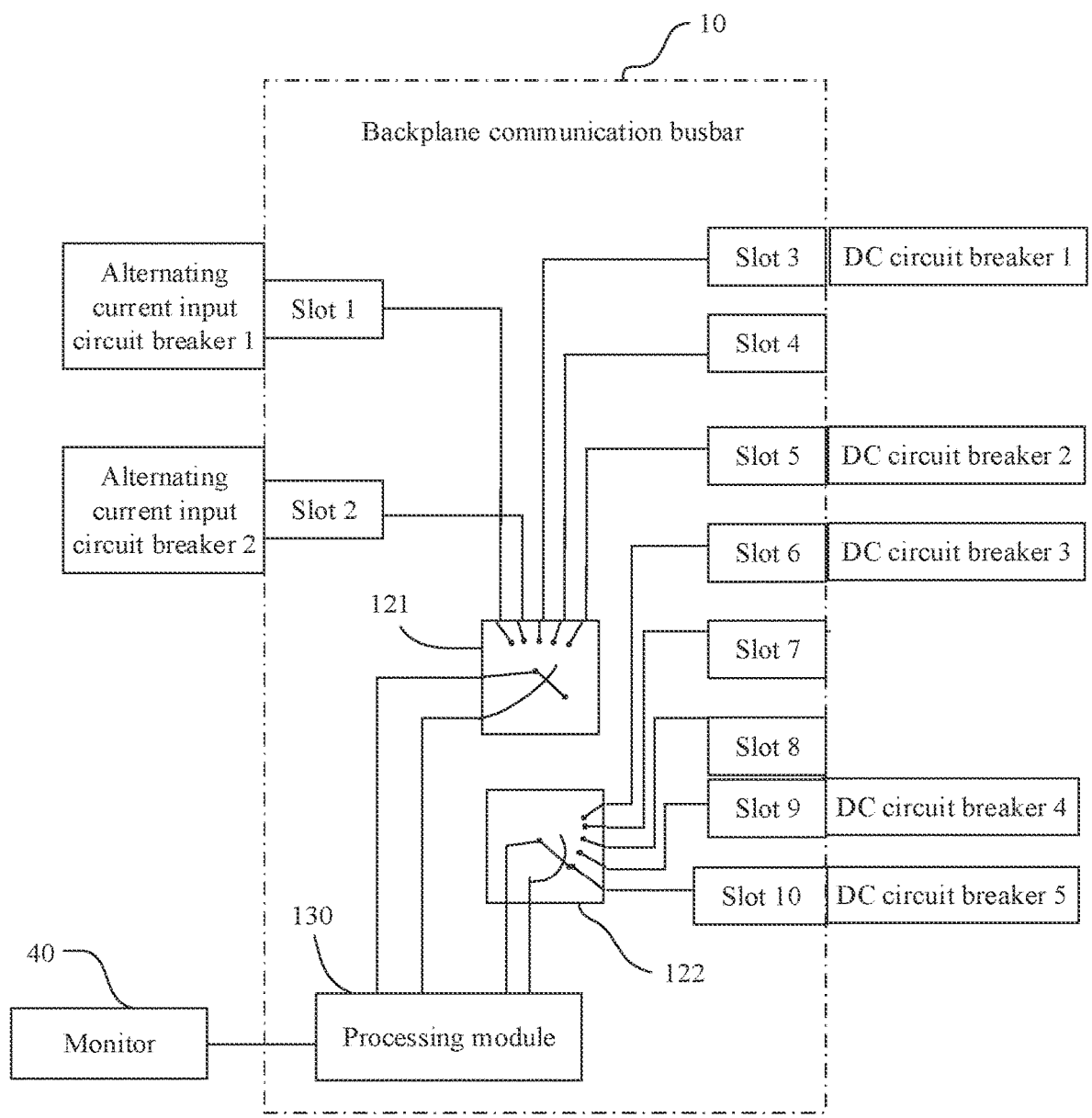
FIG. 6C is a schematic diagram of a structure of still yet another intelligent power distribution system according to an embodiment of this application.

In another possible implementation, the gating chip 120 includes at least two gating subchips, each gating subchip includes several IO interfaces, and each IO interface may be connected to an interface in one slot in the backplane communication busbar. For example, as shown in FIG. 6C, a backplane communication busbar 10 includes a first gating subchip 121 and a second gating subchip 122. A function of each gating subchip is the same as the function of the foregoing gating chip 120. A difference lies in that a quantity of IO ports of each gating subchip is less than a quantity of IO ports of the gating chip.

In an example, the first gating subchip 121 is connected to N1 interfaces in N1 slots, for example, N1=5, indicating that the first gating subchip 121 can establish five communication channels with five slot interfaces in the busbar; and the second gating subchip 122 is connected to N2 interfaces in N2 slots, for example, N2=5, indicating that the second gating subchip 122 can establish five communication channels with five slot interfaces. N=N1+N2, N is a total quantity of slots in the backplane communication busbar, and N, N1, and N2 are all positive integers.

It should be understood that in this example, a third gating subchip, a fourth gating subchip, and the like may be further included, and configured to establish independent communication channels with more slot interfaces.

In another possible implementation, if the first chip is a MCU, the MCU is connected to a part of first interfaces in the backplane communication busbar, so that there is an independent communication channel between each of the part of first interfaces and the MCU.

Figure 6D:
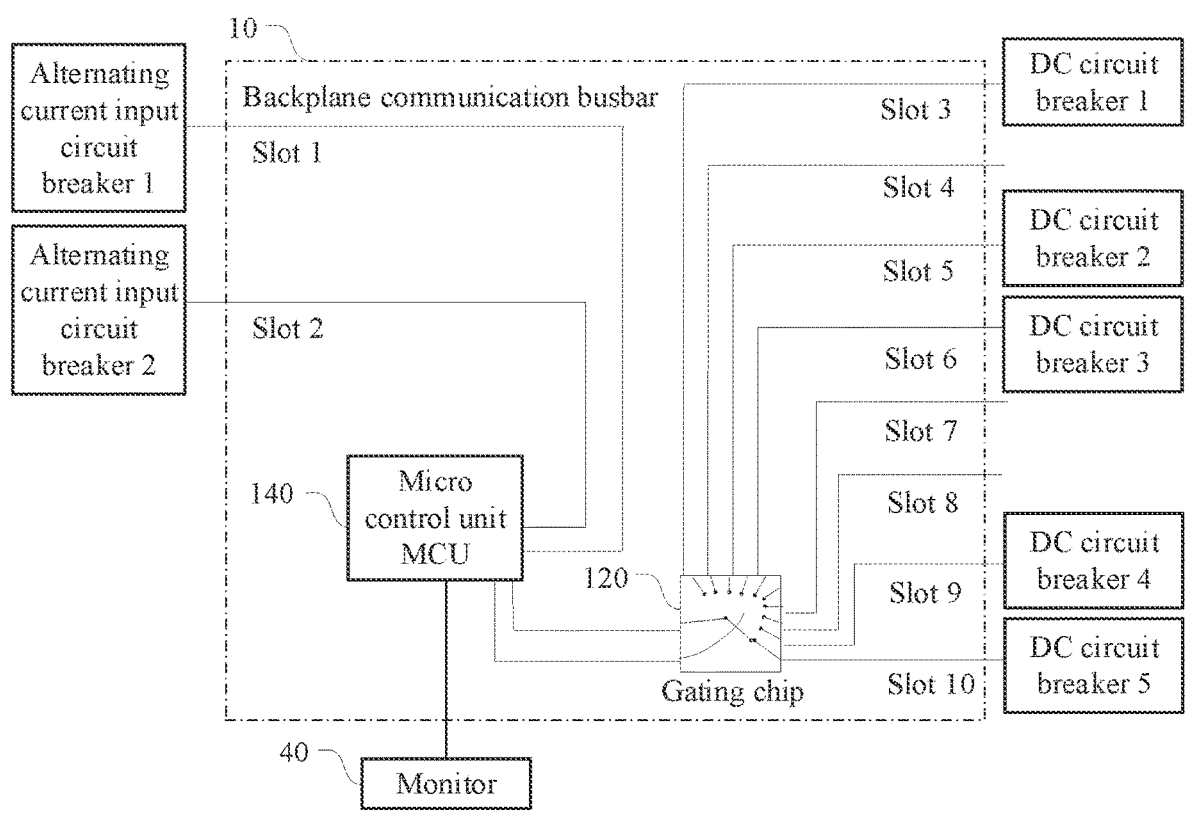
FIG. 6D is a schematic diagram of a structure of a further intelligent power distribution system according to an embodiment of this application.

In an example, in an implementation, the first chip is a combination of a MCU and a gating chip. As shown in FIG. 6D, a backplane communication busbar 10 includes a gating chip 120 and an MCU 140, and the MCU 140 is connected to a monitor 40 by using a communication bus. The MCU 140 includes three IO interfaces. Two of the three IO interfaces respectively establish communication channels with interfaces in a slot 1 and a slot 2. The third IO interface establishes communication channels with the remaining eight slots in the busbar through extension of the gating chip 120. Therefore, the MCU 140 establishes an independent communication channel with each slot interface in the busbar. In addition, the MCU 140 is configured to send/receive a signal, and identify a circuit breaker access status of each slot in the busbar based on a second signal sent by an alternating current input circuit breaker in the slot 1 or the slot 2 or sent by the gating chip 120.

Optionally, a signal conditioning board or a centralized control board is disposed in the backplane communication busbar 10, and the MCU 140 is installed on the signal conditioning board or the centralized control board.

Figure 6E:
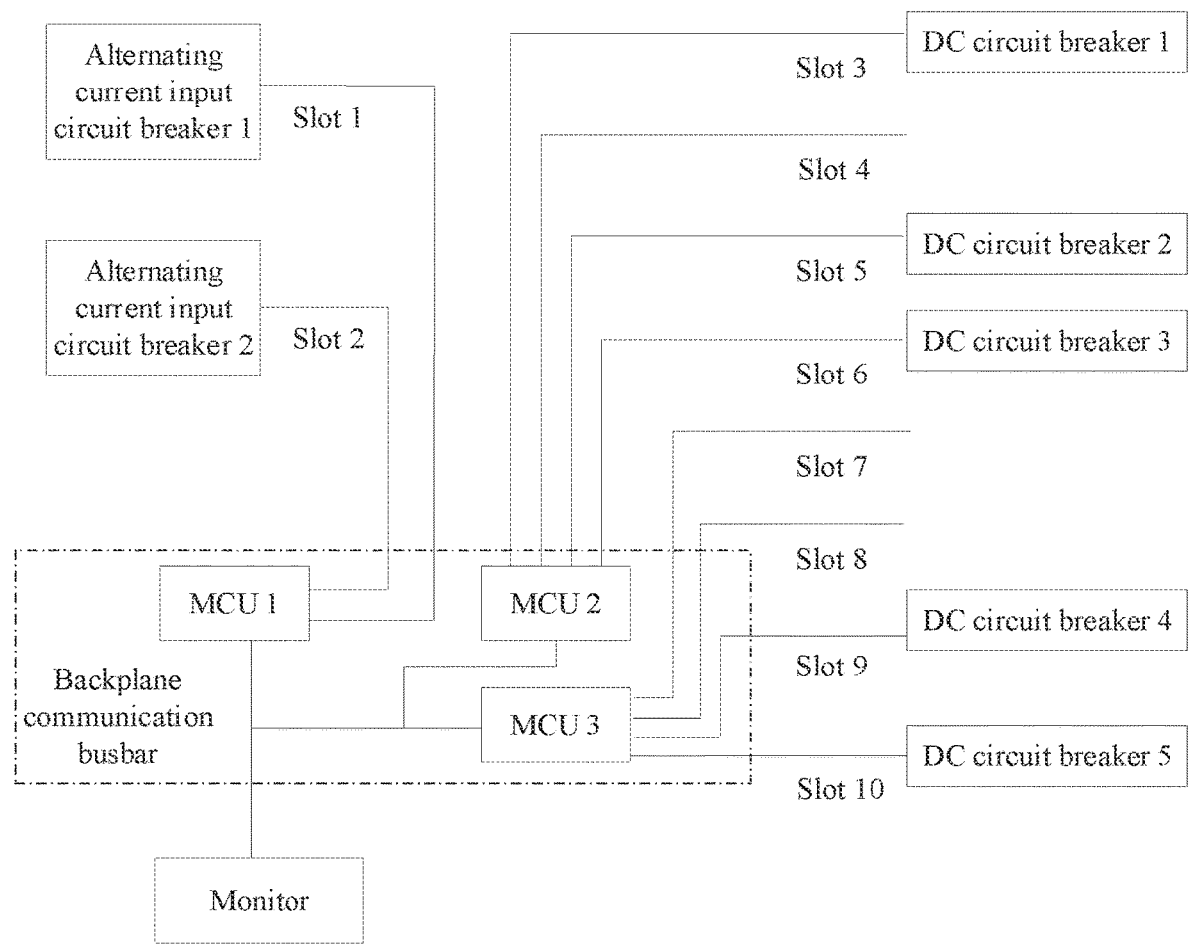
FIG. 6E is a schematic diagram of a structure of a still further intelligent power distribution system according to an embodiment of this application.

In an example, in another implementation, the first chip is at least two MCUs. As shown in FIG. 6E, a backplane communication busbar includes three MCUs, namely, an MCU 1, an MCU 2, and an MCU 3. Each MCU establishes a communication channel with at least one slot. For example, the MCU 1 separately establishes communication channels with a slot 1 and a slot 2, the MCU 2 establishes a communication channel with each interface in a slot 3 to a slot 5, and the MCU 3 establishes a communication channel with each interface in a slot 6 to a slot 10.

In addition, each MCU is configured to manage at least one slot interface connected to the MCU, identify a circuit breaker plugging status of each communication channel connected to the MCU, and report an identification result to a monitor. A process in which each MCU identifies each circuit breaker is the same as that in steps 201 to 204 in the foregoing embodiment, and details are not described herein again. After obtaining identification results reported by all the MCUs, the monitor organizes the identification results and generates a circuit breaker registry, shown in, for example, the foregoing Table 2.

In this implementation, a plurality of MCUs is disposed in the backplane communication busbar to identify a circuit breaker status of a slot managed by each MCU, to avoid making a software/hardware change on the monitor, and also avoid disposing a gating chip in the backplane communication busbar.

It should be understood that the MCU 1, MCU 2, and MCU 3 may be all disposed on a signal conditioning board or a centralized control board, and circuit breaker interfaces need to be correspondingly modified during disposition, for example, a motor control pin, a current sampling pin, and a switch status feedback pin are added, so that when a circuit breaker is plug-connected to an interface in a slot, a communication function of the circuit breaker with an MCU can be implemented. Improvements on the circuit breaker interfaces are not limited in this embodiment.

Based on the foregoing Embodiment 1 and Embodiment 2, this application further provides a method for generating a circuit breaker registry. In this method, a circuit breaker registry can be refreshed in real time, to display a circuit breaker connection status of a backplane communication busbar.

Figure 7:
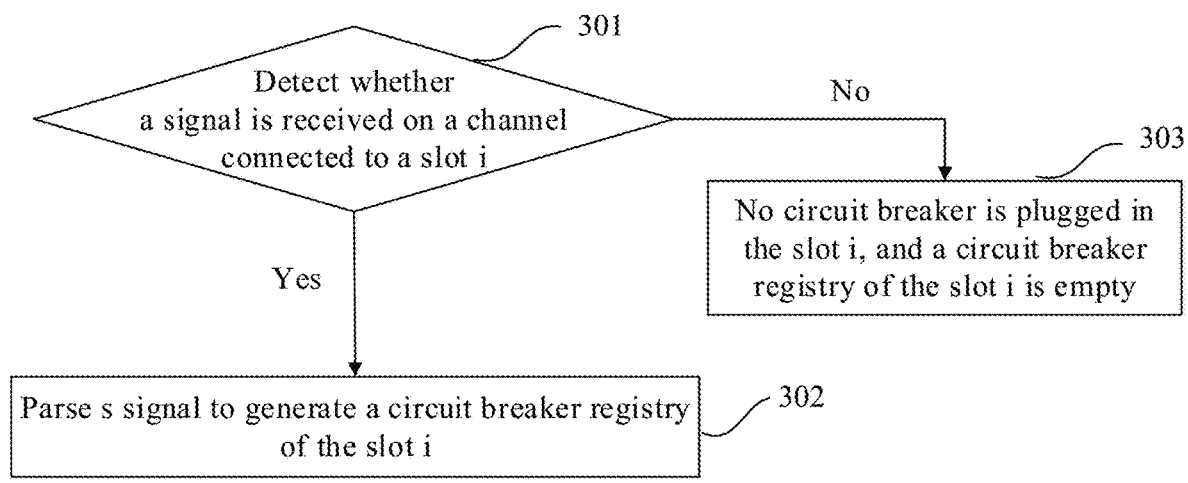
FIG. 7 is a flowchart of generating a circuit breaker registry according to an embodiment of this application.

In an example, as shown in FIG. 7, the method includes the following steps.

301: Detect whether a signal is received on a channel connected to a slot i.

The slot i is any slot in the backplane communication busbar. For example, in the foregoing embodiment of 10 slots, i is any value in 1 to 10.

In an example, in step 301, it is detected, within preset time, whether a signal is received. Further, when the method is applied to the foregoing Embodiment 1, the signal may be a data packet sent by a circuit breaker. When the method is applied to the foregoing Embodiment 2, the signal is the second signal in "step 202" in Embodiment 2.

If yes, step 302 is performed. If no, that is, no signal is received, step 303 is performed.

302: If a signal is received, parse the signal to obtain circuit breaker information, and generate a circuit breaker registry of the slot i.

The circuit breaker information includes a circuit breaker number, specification, threshold, status, and the like. For example, the circuit breaker number is a DC circuit breaker 1, and the circuit breaker specification is 63A. The generated circuit breaker registry of the slot i is as follows, such as, slot number i, DC circuit breaker 1, and 63A.

303: If no signal is received, determine that no circuit breaker is plugged in the slot i, and a circuit breaker registry of the slot i is empty in this case. For example, circuit breaker information of the slot i is recorded as NAN.

In addition, for the power distribution system in Embodiment 2, the method further includes that a first chip, a processing module, or an MCU polls all slot interfaces; and detects, according to the method in the foregoing steps 301 to 303, whether a circuit breaker is plugged in each slot and related information of a plugged circuit breaker, to generate a circuit breaker registry for all slots in the backplane communication busbar.

Then, information in the circuit breaker registry is updated. For example, after K (K=100) times of polling are completed, the registry is refreshed. In an example, registry updating under an operation such as circuit breaker plugging/unplugging/replacing is implemented. In addition, registry refreshing may be alternatively enabled and controlled by using a button.

This embodiment provides a method for updating a circuit breaker registry, and the method is applied to circuit breakers of different specifications. In an example, circuit breakers may be classified into different specifications based on values of rated currents, and have different sizes. For example, as shown in Table 3, circuit breakers of two specifications are included such as 63A and 125A. To enable a circuit breaker slot to be compatible with circuit breakers of all specifications, a non-polarity hybrid busbar shown in FIG. 8 and matching circuit breaker communication interfaces are designed. A circuit breaker of the specification 63A occupies one slot, and a circuit breaker of the specification 125A needs to occupy two slots. A core thereof is disposing the communication interface based on a minimum specification. A circuit breaker of a large specification occupies a plurality of slots, but substantially uses only the first communication slot.

TABLE 3

Circuit breaker specification table

| Circuit breaker specification | Quantity m of occupied slots |
|---|---|
| 63A | 1 |
| 125A | 2 |
| ... | ... |

Figure 8:
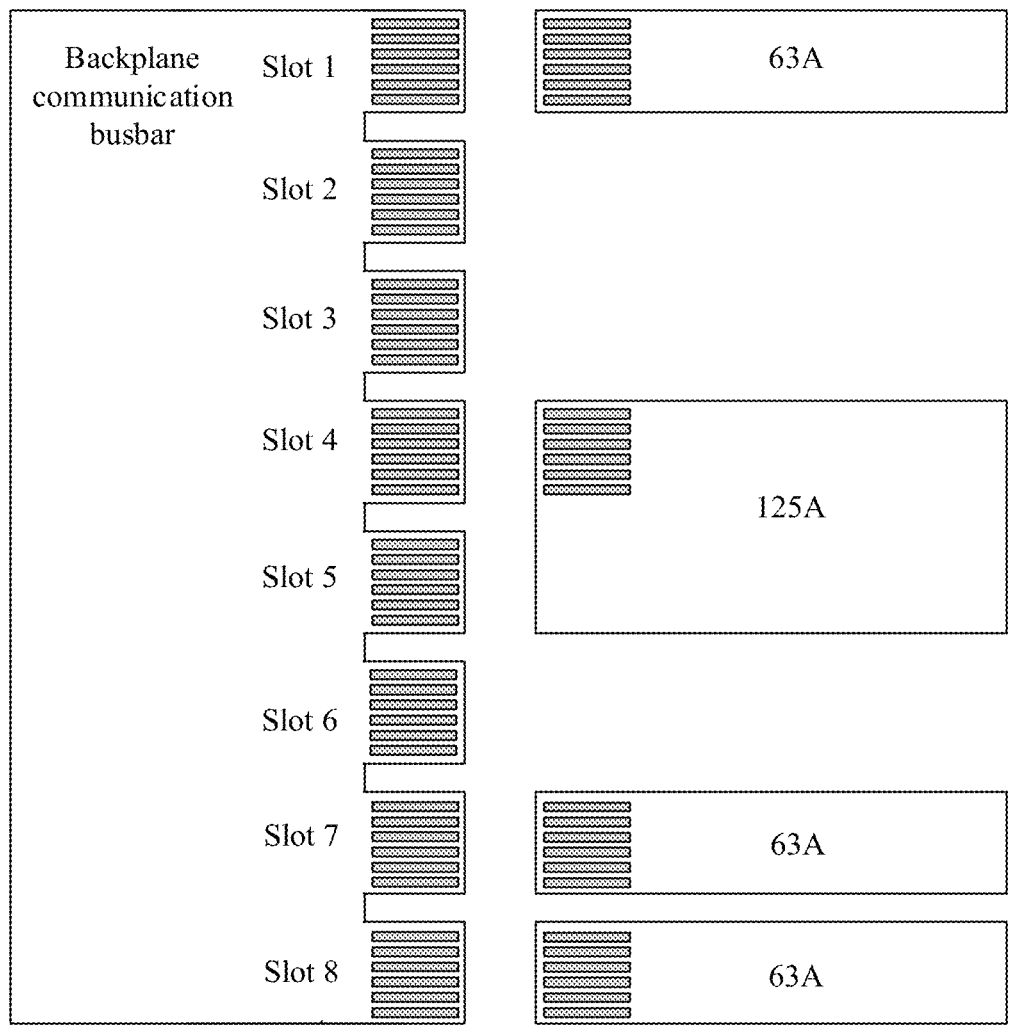
FIG. 8 is a schematic diagram of a structure of a backplane communication busbar and circuit breakers of different specifications according to an embodiment of this application.

The backplane communication busbar shown in FIG. 8 includes eight slots such as a slot 1 to a slot 8. A circuit breaker registry shown in the following Table 4 is obtained according to the methods in the foregoing Embodiment 1 and Embodiment 2.

TABLE 4

Circuit breaker registry

| Slot number | Circuit breaker number and specification | Slot number | Circuit breaker number and specification |
|---|---|---|---|
| 1 | DC circuit breaker 1, 63A | 5 | NAN |
| 2 | NAN | 6 | NAN |
| 3 | NAN | 7 | DC circuit breaker 3, 63A |
| 4 | DC circuit breaker 2, 125A | 8 | DC circuit breaker 4, 63A |

A specification of each circuit breaker is sent by the circuit breaker to a processor or a monitor after the circuit breaker establishes a communication connection with any interface in the busbar. Because the circuit breaker of the specification 125A needs to occupy two slot numbers, the circuit breaker is actually plugged in the slot number 5. Therefore, a quantity of slots actually occupied by each identified circuit breaker needs to be determined based on a slot occupation information table (Table 3) of circuit breakers of different specifications, and the corresponding quantity of slots need to be registered through sequential extension. Finally, a modified circuit breaker registry is formed.

Figure 9:
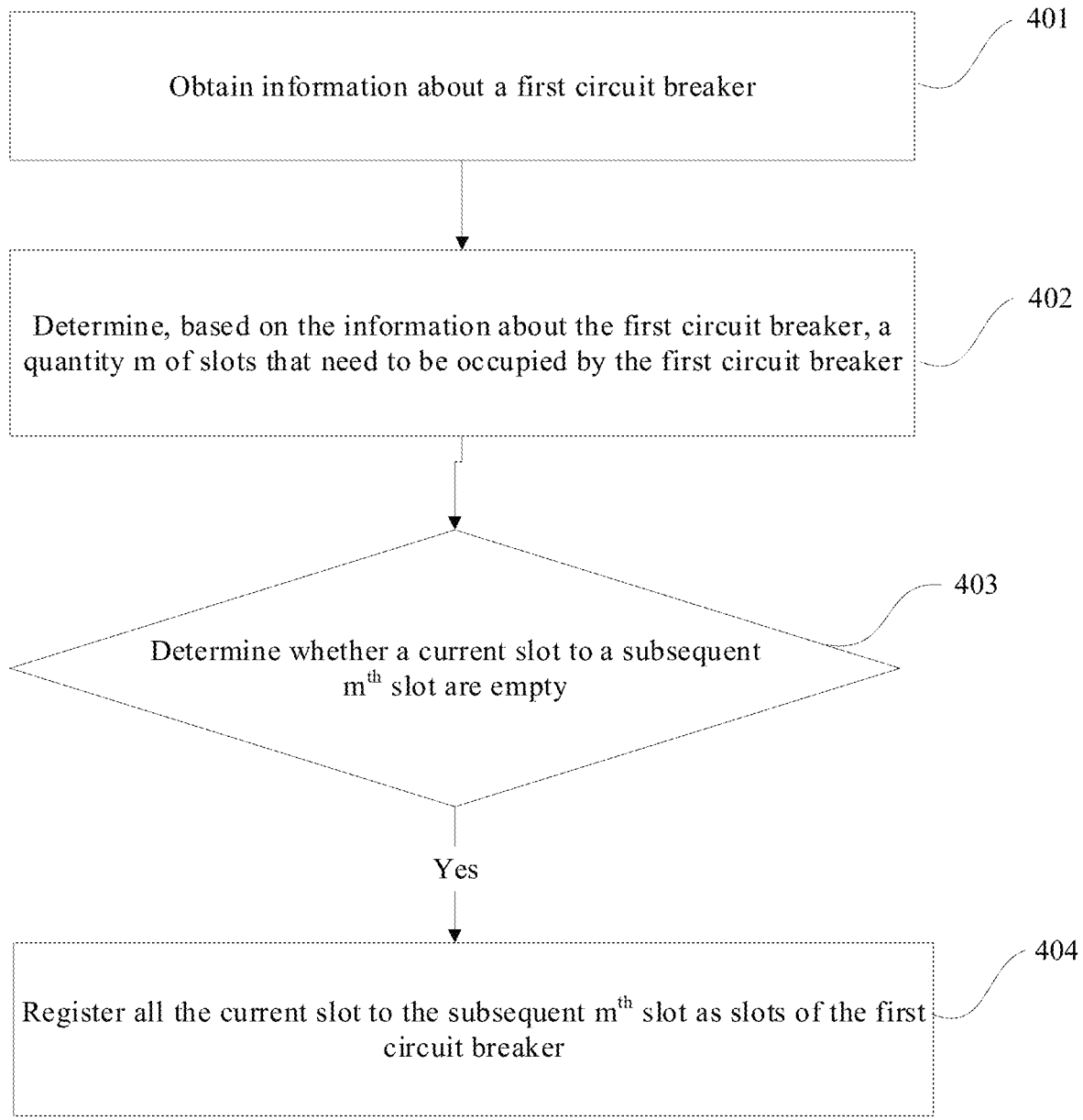
FIG. 9 is a flowchart of determining a slot number of a circuit breaker according to an embodiment of this application.

In an example, as shown in FIG. 9, the registry updating method includes the following steps.

401: Obtain information about a first circuit breaker, where the first circuit breaker is any circuit breaker plugged in the backplane communication busbar.

402: Determine, based on the information about the first circuit breaker, a quantity m of slots that need to be occupied by the first circuit breaker.

If a specification of the first circuit breaker is 63A, the quantity m of slots that need to be occupied is 1. If a specification is 125A, the quantity m of slots that need to be occupied is 2.

403: Determine whether a current slot to a subsequent $m^{th}$ slot are empty. In this example, it is determined whether the slot 4 is empty.

404: If yes, register all the current slot to the subsequent $m^{th}$ slot as slots of the first circuit breaker.

Because the circuit breaker of the specification 125A occupies two slots, and the first slot (slot 4) is empty, both the slot 4 and the next slot 5 are registered as slots of the first circuit breaker, and the circuit breaker registry is corrected. A corrected circuit breaker registry is shown in Table 5.

TABLE 5

Corrected circuit breaker registry

| Slot number | Circuit breaker number and specification | Slot number | Circuit breaker number and specification |
|---|---|---|---|
| 1 | DC circuit breaker 1, 63A | 5 | DC circuit breaker 2, 125A |
| 2 | NAN | 6 | NAN |
| 3 | NAN | 7 | DC circuit breaker 3, 63A |
| 4 | DC circuit breaker 2, 125A | 8 | DC circuit breaker 4, 63A |

In addition, in step 403, if determining that the current slot to the subsequent $m^{th}$ slot are not empty, the system reports an error, that is, the slot 4 and the slot 5 are incorrect, and checks an error cause.

In this embodiment, a circuit breaker registry can be refreshed and corrected in real time, so that a circuit breaker connection status of the backplane communication busbar can be accurately displayed, thereby facilitating subsequent operation and maintenance of the power distribution system.

Figure 10:
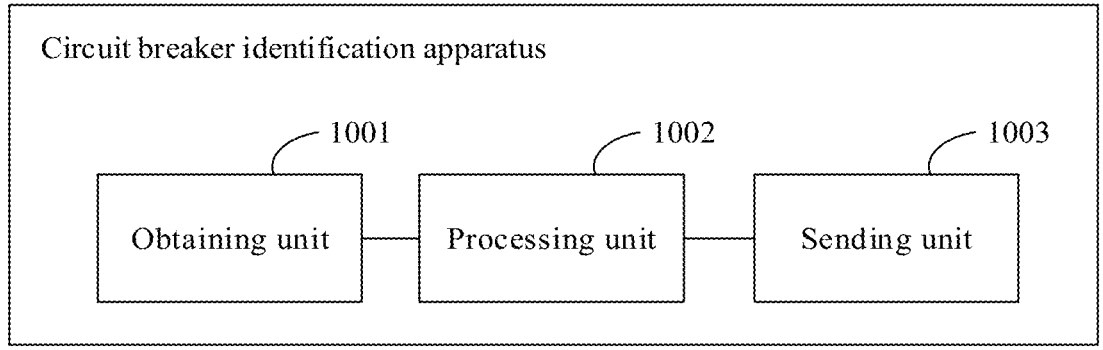
FIG. 10 is a schematic diagram of a structure of a circuit breaker identification apparatus according to an embodiment of this application.

Corresponding to the method in the foregoing Embodiment 1, an embodiment of this application provides a circuit breaker identification apparatus. The apparatus is applied to a first power distribution system. As shown in FIG. 10, the circuit breaker address identification apparatus includes an obtaining unit 1001, a processing unit 1002, and a sending unit 1003. In addition, the apparatus may further include a storage unit or another unit or module. This is not limited in this embodiment.

The first power distribution system includes a backplane communication busbar and at least one circuit breaker. The backplane communication busbar includes at least one slot, a first interface is configured in each slot, each first interface is connected to a first resistor R1, and each first resistor R1 has a different resistance value. Each circuit breaker includes a second interface, the second interface is connected to a second resistor R2, and when the second interface of the circuit breaker is plugged in any first interface in the backplane communication busbar, a preset voltage interval corresponding to a resistance value of a first resistor R1 is uniquely determined by using a series circuit including the first resistor R1 and the second resistor R2. For a circuit structure, refer to the descriptions in the foregoing Embodiment 1. Details are not described herein again.

Further, the obtaining unit 1001 is configured to, when a second interface of a first circuit breaker is plugged in any first interface in the backplane communication busbar, obtain a first voltage of the first circuit breaker, where the first circuit breaker is any one of the at least one circuit breaker; and the processing unit 1002 is configured to, determine a voltage interval within which the first voltage falls, where the voltage interval is one of different preset voltage intervals corresponding to different resistance values of first resistors R1; and determine, based on the voltage interval and correspondences between the preset voltage intervals and slot numbers, a number of a slot in which the first circuit breaker is plugged.

Optionally, in an example implementation, the obtaining unit 1001 is further configured to, before the number of the slot in which the first circuit breaker is plugged is determined, obtain the correspondences between the preset voltage intervals and the slot numbers, where the correspondences include a relationship between a preset voltage interval corresponding to each resistance value of the first resistor R1 and a slot number corresponding to the resistance value.

The preset voltage interval is obtained based on a sampled voltage of a second resistor R2; and the sampled voltage of the second resistor R2 is obtained through calculation based on a reference voltage, a resistance value of a first resistor R1, and a resistance value of the second resistor R2.

Optionally, in another implementation, the obtaining unit 1001 is further configured to obtain a data packet sent by the first circuit breaker, where the data packet includes a number of the first circuit breaker; and the processing unit 1002 is further configured to generate a circuit breaker registry based on the number of the first circuit breaker and the slot number of the first circuit breaker, where the circuit breaker registry includes a correspondence between the number of the first circuit breaker and the slot number of the first circuit breaker.

In addition, the apparatus provided in this embodiment is further applicable to the method in the foregoing Embodiment 2. In an example, the apparatus is applied to a second power distribution system, and the second power distribution system includes a backplane communication busbar and at least one circuit breaker. The backplane communication busbar includes a first chip and at least one slot, a first interface is configured in each slot, there is an independent communication channel between the first chip and at least one first interface, and each communication channel corresponds to a number of one slot in which a first interface is located. For a circuit structure, refer to the descriptions in the foregoing Embodiment 2. Details are not described herein again.

Further, the sending unit 1003 is configured to send, by using a first communication channel, a first signal to a first interface corresponding to the first communication channel, where the first communication channel is any one of the at least one independent communication channel established between the first chip and the at least one first interface. The processing unit 1002 is configured to, if a second signal fed back by using the first communication channel is received, determine that a circuit breaker is plugged in the first interface connected to the first communication channel and a number of a slot in which the circuit breaker is plugged. The processing unit 1002 is further configured to parse the second signal to obtain a number of the circuit breaker, where the second signal includes the number of the circuit breaker; and identify, based on the number of the circuit breaker and the number of the slot in which the circuit breaker is plugged, the circuit breaker plugged in the first interface.

Optionally, if the first chip is a gating chip, the gating chip is connected to all first interfaces in the backplane communication busbar, so that there is an independent communication channel between each of all the first interfaces and the gating chip.

Optionally, if the first chip is a MCU, the MCU is connected to a part of first interfaces in the backplane communication busbar, so that there is an independent communication channel between each of the part of first interfaces and the MCU.

Optionally, in an example implementation, the processing unit 1002 is further configured to generate a circuit breaker registry based on the number of the circuit breaker and the number of the slot in which the circuit breaker is plugged, where the circuit breaker registry includes a correspondence between the number of the circuit breaker and the slot number of the circuit breaker.

In addition, the processing unit 1002 is further configured to perform the method in the foregoing steps 301 to 303 or steps 401 to 404.

The foregoing embodiments of this application provide the method for automatically identifying an intelligent circuit breaker, so that a number of a slot, in a backplane communication busbar, in which each circuit breaker is plugged and a number of the circuit breaker can be automatically identified. Therefore, accurate remote power-on/off and fault diagnosis can be supported, thereby facilitating monitoring and operation and maintenance of a power distribution system.

In addition, in the technical solutions in embodiments of this application, a total slot utilization status of a busbar of a plug-in frame or a cabinet can be further automatically identified, so that slot resource management becomes intelligent, thereby facilitating maintenance and expansion planning.

Figure 11:
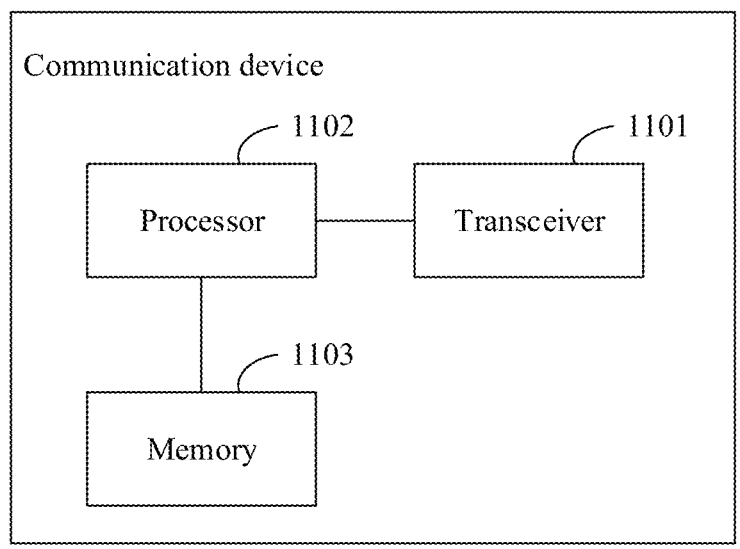
FIG. 11 is a schematic diagram of a structure of a communication device according to an embodiment of this application.

The following describes a hardware device corresponding to the foregoing embodiments. This embodiment provides a communication device. The communication device is configured to implement the methods in the foregoing embodiments. In an example, as shown in FIG. 11, the communication device includes a transceiver 1101, a processor 1102, and a memory 1103. In addition, the communication device may further include more or fewer components, or combine some components, or have different component arrangements. This is not limited in this application.

Further, the processor 1102 is a control center of the communication device, and is connected to each part of the entire communication device through various interfaces and lines. The processor 1102 runs or executes a software program or a module stored in the memory 1103, and invokes data stored in the memory 1103, to perform various functions of the communication device or process data.

The processor 1102 may include an IC, for example, may include a single encapsulated IC, or may include a plurality of connected encapsulated ICs that have same or different functions. For example, the processor 1102 may include a CPU or the like.

The transceiver 1101 is configured to establish a communication channel, so that the communication device is connected to an external device by using the communication channel. The external device includes a monitor and at least one first interface in a backplane communication busbar. When a circuit breaker is plugged in a slot to be connected to a first interface, communication between the circuit breaker and the transceiver 1101 can be implemented. Optionally, the transceiver 1101 may be a module that completes a sending/receiving function, for example, may appear in a form of an integrated circuit chip (integrated circuit chip), and may be obtained through selective combination.

The memory 1103 may include a volatile memory, for example, a random-access memory (RAM); or may include a non-volatile memory, for example, a flash memory, a hard disk drive (HDD), or a solid-state drive (SSD). Alternatively, the memory 703 may include a combination of the foregoing types of memories. The memory may store a program, code, or data.

In addition, the memory 1103 is further configured to store a preset voltage list, a circuit breaker registry, and the like.

Further, the functions of the obtaining unit 1001 and the sending unit 1003 in FIG. 10 may be implemented by the transceiver 1101 of the communication device, or may be implemented by the transceiver 1101 controlled by the processor 1102; and the functions to be implemented by the processing unit 1002 may be implemented by the processor 1102.

Optionally, the communication device may be a chip, and the chip includes a microprocessor chip and a gating chip.

Optionally, in a power distribution system, the backplane communication busbar further includes a signal conditioning board, and the signal conditioning board includes the microprocessor chip and the gating chip.

Optionally, the communication device may be further disposed in a monitor or another component in the power distribution system. In addition, the monitor is connected to the backplane communication busbar by using a communication bus, the monitor includes a second power module, and the second power module is configured to provide the reference voltage $V_{ref}$. It may be understood that the power module that provides the reference voltage may be disposed in the backplane communication busbar, or may be disposed in the monitor. This is not limited in this embodiment.

In addition, this application further provides a computer storage medium. The computer storage medium may store a program. When the program is executed, some or all of the steps in embodiments for the circuit breaker identification method provided in this application may be performed. The storage medium may be a magnetic disk, an optical disc, a read-only memory (ROM), a RAM, or the like.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions, for example, identification instructions. When the computer programs are loaded and executed on a computer, all or some of the procedures or functions are generated according to embodiments of this application. The computer may be a general-purpose computer, a dedicated computer, a computer network, or another programmable apparatus. The computer instructions may be stored in a computer-readable storage medium.

The computer-readable storage medium may be any usable medium accessible by a computer, or a storage device, such as a server or a data center, integrating one or more usable media. The usable medium may be a magnetic medium, for example, a floppy disk, a hard disk, or a magnetic tape; an optical medium (for example, a digital video disc (DVD)); or a semiconductor medium, for example, a SSD.

In addition, it should be noted that in addition to being applied to an intelligent power distribution system and an intelligent circuit breaker system, the technical solutions in embodiments of this application are also applicable to identification of a physical address of a rectifier module or another scenario, in which physical addresses of modules in a system need to be identified, having a relatively fixed layout form. The circuit breaker address identification method in embodiments are also applicable to identification of a physical address of a rectifier module in a plug-in frame power supply system in this application.

In the specification, claims, and accompanying drawings of this application, the terms "first", "second", and the like are intended to distinguish between similar objects but do not indicate a specific order or sequence. It should be understood that the data used in such a way are interchangeable in proper circumstances so that embodiments described herein can be implemented in an order other than the order illustrated or described herein. Moreover, the terms "include", "comprise" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

For same or similar parts in embodiments in this specification, refer to each other. For example, the embodiment of the communication device is basically similar to the method embodiment, and therefore is described briefly. For related parts, refer to the descriptions in the method embodiment.

The foregoing implementations of this application do not constitute a limitation on the protection scope of this application.

What is claimed is:

1. A circuit breaker identification method, comprising:
    obtaining a first voltage of a first circuit breaker of at least one circuit breaker when a second interface of the first circuit breaker is inserted into any interface of a backplane communication busbar, wherein the backplane communication busbar comprises at least one slot, wherein each slot of the at least one slot is configured with a corresponding first interface, wherein each first interface is connected to a corresponding first resistor R1, wherein each first resistor R1 has a different resistance value, wherein each circuit breaker of the at least one circuit breaker comprises a corresponding second interface, and wherein each second interface is connected to a corresponding second resistor R2;
    determining a first voltage interval within which the first voltage falls, wherein the first voltage interval is a first preset voltage interval that is one of a plurality of different preset voltage intervals, and wherein the different preset voltage intervals correspond to different resistance values of the first resistors R1; and
    determining, based on the first voltage interval and corresponding relationships between the different preset voltage intervals and slot numbers, a number of a slot in which the first circuit breaker is inserted.

2. The circuit breaker identification method of claim 1, wherein before determining the number of the slot in which the first circuit breaker is inserted, the circuit breaker identification method further comprises obtaining the corresponding relationships between the different preset voltage intervals and the slot numbers, wherein the corresponding relationships comprise a relationship between a preset voltage interval corresponding to each resistance value of the corresponding first resistor R1 and a slot number corresponding to the resistance value.

3. The circuit breaker identification method of claim 2, further comprising:
    obtaining a sampled voltage of the corresponding second resistor R2 through calculation based on a reference voltage, a first resistance value of at least one of the corresponding first resistor R1, and a second resistance value of the corresponding second resistor R2; and
    obtaining each of the different preset voltage intervals based on the sampled voltage.

4. The circuit breaker identification method of claim 1, further comprising:
    obtaining a data packet from the first circuit breaker, wherein the data packet comprises a number of the first circuit breaker; and
    generating a circuit breaker registry based on the number of the first circuit breaker and the number of the slot in which the first circuit breaker is inserted, wherein the circuit breaker registry comprises a correspondence between the number of the first circuit breaker and the number of the slot in which the first circuit breaker is inserted.

5. A circuit breaker identification method applied to a power distribution system, wherein the circuit breaker identification method comprises:
    sending, via a first communication channel, a first signal to a first interface of at least one first interface corresponding to the first communication channel, wherein the first communication channel is any independent communication channel between a first chip of a backplane communication busbar and the at least one first interface, and wherein the backplane communication busbar comprises the first chip and at least one slot, and wherein each slot of the at least one slot is configured with a corresponding first interface of the at least one first interface;
    receiving, via the first communication channel and in response to the first signal, a second signal comprising a number of a circuit breaker of at least one circuit breaker;
    determining that the circuit breaker is inserted in the first interface connected to the first communication channel and determining a number of a slot in which the circuit breaker is inserted in response to the second signal;
    parsing the second signal to obtain the number of the circuit breaker; and
    identifying, based on the number of the circuit breaker and the number of the slot in which the circuit breaker is inserted, the circuit breaker that is inserted in the first interface.

6. The circuit breaker identification method of claim 5, further comprising connecting a gating chip to all first interfaces of the at least one first interface when the first chip is the gating chip such that the power distribution system comprises an independent communication channel between each first interface of the at least one first interface and the gating chip.

7. The circuit breaker identification method of claim 5, further comprising connecting a microcontroller unit (MCU) to a part of the at least one first interface when the first chip is the MCU such that the power distribution system comprises an independent communication channel between each first interface of the part of the at least one first interface and the MCU.

8. The circuit breaker identification method of claim 5, further comprising generating a circuit breaker registry based on the number of the circuit breaker and the number of the slot in which the circuit breaker is inserted, and wherein the circuit breaker registry comprises a correspondence between the number of the circuit breaker and the number of the slot in which the circuit breaker is inserted.

9. A circuit breaker identification apparatus applied to a power distribution system and comprising:
    a backplane communication busbar comprising at least one slot, wherein each slot of the at least one slot is configured with a corresponding first interface, wherein each first interface is connected to a corresponding first resistor R1, and wherein each first resistor R1 has a different resistance value;
    at least one circuit breaker coupled to the backplane communication busbar, wherein each circuit breaker of the at least one circuit breaker comprises a corresponding second interface, and wherein each second interface is connected to a corresponding second resistor R2; and a processor coupled to the at least one circuit breaker and configured to:
  obtain a first voltage of a first circuit breaker of the at least one circuit breaker when a second interface of the first circuit breaker is plugged into any interface of the backplane communication busbar, wherein the first circuit breaker is any one of the at least one circuit breaker;
  determine a first voltage interval within which the first voltage falls, wherein the first voltage interval is a first preset voltage interval that is one of a plurality of different preset voltage intervals, and wherein the different preset voltage intervals correspond to different resistance values of the first resistors R1; and
  determine, based on the first voltage interval and corresponding relationships between the different preset voltage intervals and slot numbers, a number of a slot in which the first circuit breaker is inserted.

10. The circuit breaker identification apparatus of claim 9, wherein the processor is further configured to obtain the corresponding relationships between the different preset voltage intervals and the slot numbers before determining the number of the slot in which the first circuit breaker is inserted, wherein each of the corresponding relationships comprise a relationship between a preset voltage interval corresponding to each resistance value of the corresponding first resistor R1 and a slot number corresponding to the resistance value.

11. The circuit breaker identification apparatus of claim 10, wherein the processor is further configured to:
  obtain a sampled voltage of the corresponding second resistor R2 through calculation based on a reference voltage, a first resistance value of at least one of the corresponding first resistors R1, and a second resistance value of the corresponding second resistor R2; and
  obtain each of the different preset voltage intervals based on the sampled voltage.

12. The circuit breaker identification apparatus of claim 9, wherein the processor is further configured to:
  obtain a data packet from the first circuit breaker, wherein the data packet comprises a number of the first circuit breaker; and
  generate a circuit breaker registry based on the number of the first circuit breaker and the number of the slot in which the first circuit breaker is inserted, wherein the circuit breaker registry comprises a correspondence between the number of the first circuit breaker and the number of the slot in which the first circuit breaker is inserted.

13. A circuit breaker identification apparatus applied to a power distribution system and comprising:
  a backplane communication busbar comprising:
    a first chip;
    at least one first interface; and
    at least one slot, wherein each slot of the at least one slot is configured with a corresponding first interface of the at least one first interface;
  a transceiver coupled to the backplane communication busbar and configured to:
    send, via a first communication channel, a first signal to a first interface of the at least one first interface corresponding to the first communication channel, wherein the first communication channel is any independent communication channel between the first chip and the at least one first interface; and
    receive, via the first communication channel and in response to the first signal, a second signal comprising a number of a circuit breaker;
  at least one circuit breaker coupled to the backplane communication busbar and the transceiver; and
  a processor coupled to the at least one circuit breaker and configured to:
    determine that the circuit breaker of the at least one circuit breaker is inserted in the first interface connected to the first communication channel and determine a number of a slot in which the circuit breaker is inserted in response to the second signal;
    parse the second signal to obtain the number of the circuit breaker; and
    identify, based on the number of the circuit breaker and the number of the slot in which the circuit breaker is inserted, the circuit breaker that is inserted in the first interface.

14. The circuit breaker identification apparatus of claim 13, wherein a gating chip is connected to all first interfaces of the at least one first interface in the backplane communication busbar such that the power distribution system comprises an independent communication channel between each first interface of the at least one first interface and the gating chip.

15. The circuit breaker identification apparatus of claim 13, wherein a microcontroller unit (MCU) is connected to a part of the at least one first interface such that the power distribution system comprises an independent communication channel between each first interface of the part of the at least one first interface and the MCU.

16. The circuit breaker identification apparatus of claim 13, wherein the processor is further configured to generate a circuit breaker registry based on the number of the circuit breaker and the number of the slot in which the circuit breaker is inserted, and wherein the circuit breaker registry comprises a correspondence between the number of the circuit breaker and the number of the slot in which the circuit breaker is inserted.

17. The circuit breaker identification apparatus of claim 13, wherein each independent communication channel corresponds to a number of a slot of the at least one slot in which the corresponding first interface is located.

18. The circuit breaker identification method of claim 1, further comprising determining the first voltage interval using a series circuit comprising the corresponding first resistor R1 and the corresponding second resistor R2.

19. The circuit breaker identification method of claim 5, wherein each independent communication channel corresponds to a number of a slot of the at least one slot in which the corresponding first interface is located.

20. The circuit breaker identification apparatus of claim 9, wherein the processor is further configured to determine the first voltage interval using a series circuit comprising the corresponding first resistor R1 and the corresponding second resistor R2.

* * * * *